USO05617117A

United States Patent [19]
Kataoka et al.

[11] Patent Number: 5,617,117
[45] Date of Patent: Apr. 1, 1997

[54] INPUT DEVICE

[75] Inventors: Mitsuteru Kataoka, Katano; Takeshi Imanaka, Nara; Atsushi Tanaka, Neyagawa; Sozo Yamamoto, Osaka, all of Japan

[73] Assignee: Matsushita Electric Industrial Co., Ltd., Osaka, Japan

[21] Appl. No.: 412,735

[22] Filed: Mar. 29, 1995

[30] Foreign Application Priority Data

Mar. 30, 1994 [JP] Japan .................................. 6-060763
Jun. 13, 1994 [JP] Japan .................................. 6-130015

[51] Int. Cl.$^6$ ..................................................... G09G 5/08
[52] U.S. Cl. .......................................... 345/157; 345/173
[58] Field of Search ................................... 345/157, 159, 345/173, 145, 162; 178/18, 19

[56] References Cited

U.S. PATENT DOCUMENTS 3,911,419  10/1975  Bates et al. .............................. 345/162
5,327,161   7/1994  Logan et al. ............................. 345/173
5,376,947  12/1994  Karada ..................................... 345/173

Primary Examiner—Regina D. Liang
Attorney, Agent, or Firm—Ratner & Prestia

[57] ABSTRACT

The present invention is directed to the provision of an input device for inputting coordinates that is natural to operate. In the present invention, coordinate input device outputs one- or higher-dimensional coordinates of an object placed in close proximity thereto or in contact therewith, and pressed or not-pressed information indicating whether said object is pressed or not pressed thereon. Cursor generating device accepts at its inputs the coordinates and the pressed or not-pressed information output from the coordinate input device, repositions the cursor in accordance with the input coordinates, and outputs an image with the external appearance of the cursor changed in accordance with the pressed or not-pressed information. Further, image generating device outputs a synthesized image synthesized by combining an image output from the cursor generating device and an image input at an image input terminal. Display device accepts the image output from the image generating device and displays the synthesized image.

3 Claims, 20 Drawing Sheets

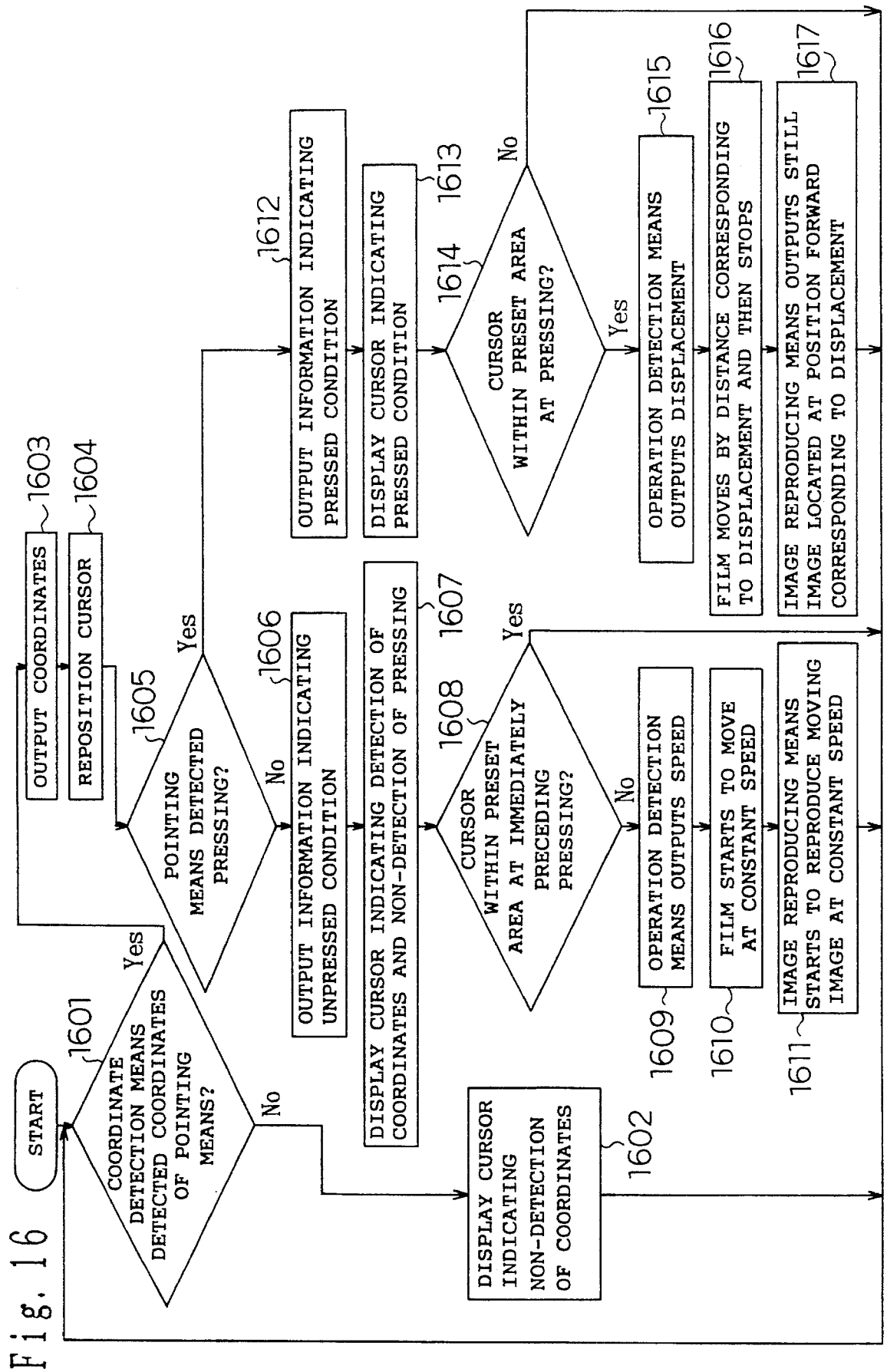

INPUT DEVICE

BACKGROUND OF THE INVENTION

1. Field of the Invention

The present invention relates to an input device by which a user inputs coordinate information, etc. while observing a cursor displayed, for example, on a display device.

2. Description of the Prior Art

FIG. 17 is a block diagram showing a simplified form of the configuration of a prior art input device.

The input device of the prior art, indicated by reference numeral 1701 in the figure, comprises a coordinate detection means 1702, a pointing means 1703, a coordinate output terminal 1704, a cursor generating means 1705, an image input terminal 1706, an image generating means 1707, and a display means 1708.

The coordinate detection means, indicated at 1702, detects position information of an object placed in close proximity to the coordinate detection means 1702. The coordinate detection means 1702 outputs the coordinates of the object detected and information indicating whether or not the coordinates of the object are currently detected (hereinafter called the "detection information"). The coordinate detection means 1702 is, for example, an electromagnetic inductance tablet, a resistive film tablet, or an electrostatic capacitance tablet.

The pointing means, indicated at 1703, is the object whose coordinates are to be detected on the coordinate detection means 1702. The pointing means 1703 outputs information indicating whether the coordinate detection means 1702 is being pressed by the pointing means 1703 (hereinafter called the "pressing information").

An example of the structure of the pointing means 1703 will be described in detail below with reference to drawing. FIG. 18 is a diagram showing an example of the structure of the coordinate detection means 1702.

Indicated at 1801 is the pointing means, which comprises a holding means 1802, a pressing detection means 1803, and a coordinate pointing means 1804.

The user operates the pointing means 1801 by holding the holding means 1802 with his hand. The holding means 1802 is shaped, for example, like a penholder.

The pressing detection means, indicated at 1803, detects the pressing of the coordinate detection means 1702 by the pointing means 1801. The pressing detection means 1803 outputs information indicating the detection of the pressing. The pressing detection means 1803 is built into the pointing means 1801, and when a pressing force is applied to the pointing means 1801, the force is also applied to the pressing detection means 1803. The force applied vertically on the coordinate detection means 1702 is thus transmitted to the pressing detection means 1803, accomplishing the detection of the pressing by the pointing means 1801 on the coordinate detection means 1702. The pressing detection means 1803 is, for example, a mechanical push switch.

The coordinate pointing means, indicated at 1804, is located at the tip of the pointing means 1801. The coordinate pointing means 1804 has the property of being able to detect coordinates on the coordinate detection means 1702. For example, when the coordinate detection means 1702 is an electromagnetic induction tablet, the coordinate pointing means 1804 is formed from a ferromagnetic material.

The coordinate output terminal, indicated at 1704, is coupled to the coordinates output from the coordinate detection means 1702 and also to the pressing information output from the pointing means 1703. The coordinate output terminal 1704 is used to connect the input device 1701 to an external device.

The cursor generating means, indicated at 1705, accepts at its inputs the detection information and coordinates output from the coordinate detection means 1702 and the pressing information output from the pointing means 1703, and outputs an image of a cursor.

An example of the image output from the cursor generating means 1705 will be described below with reference to FIG. 19.

Reference numeral 1901 indicates an image output from the cursor generating means 1705, and 1902 designates a cursor. The position of the cursor 1902 in the image 1901 changes in accordance with the input coordinates. Further, the external appearance of the cursor 1902 changes in accordance with the input pressing information and input detection information. For example, when the detection information indicates a coordinates non-detected condition, the cursor 1902 is not displayed. When the pressing information indicates a pressed condition, the cursor 1902 is displayed in a different color than when in an unpressed condition.

The image input terminal, indicated at 1706, is used to input an image from an external device to the input device 1701.

An example of the image input via the image input terminal 1706 will be described below with reference to FIG. 20.

Reference numeral 2001 indicates an image input at the image input terminal 1706, and 2002 designates window images included in the image 2001. The image 2001 input at the image input terminal 1706 is, for example, a display screen produced by an ordinary window system.

The inputs of the image generating means 1707 are coupled to the output of the cursor generating means 1705 and the output of the image input terminal 1706. The image synthesizing means 1707 synthesizes an image, for example, by superimposing an image output from the cursor generating means 1705 over an image input via the image input terminal 1706. The image may be synthesized by taking an intermediate color between the two input images.

An example of the image output from the image synthesizing means 1707 will be described below with reference to FIG. 21.

Reference numeral 2101 indicates an image output from the image generating means 1707. The image 2101 is the image output when the output of the cursor generating means 1705 is the image shown in FIG. 19 and the input of the image input terminal 1706 is the image shown in FIG. 20.

The cursor indicated at 2102 is the same as the cursor 1902 contained in the output of the cursor generating means 1705.

The images indicated at 2103 are the same as the images 2002 contained in the input of the image input terminal 1706.

The display means, indicated at 1708, accepts the image output from the image generating means 1707.

The display means 1708 displays the input image. The display means 1708 is, for example, a CRT display or a liquid-crystal display.

Next, the operation of the prior art input device 1701 will be described with reference to the flowchart shown in FIG. 22.

(Step 2201) When the coordinate detection means 1702 has detected the coordinates of the pointing means 1703, the process proceeds to step 2203.

(Step 2202) The cursor 1902 included in the image generated by the cursor generating means 1705 is changed to a pictorial symbol that indicates non-detection of the coordinates. The generated image is fed to the image synthesizing means 1707 for image synthesis, and the synthesized image is displayed on the display means 1708. Then, the process returns to step 2201.

(Step 2203) The coordinates obtained in step 2202 are output at the coordinate output terminal 1704.

(Step 2204) The cursor generating means 1705 changes the position of the cursor 1902 in accordance with the coordinates output from the coordinate detection means 1702. The generated image is fed to the image generating means 1707 for image synthesis, and the synthesized image is displayed on the display means 1708. Repositioning of the cursor 1902 is thus accomplished.

The amount of movement of the cursor 1902 is determined by the pointer's coordinates obtained by the coordinate detection means 1702. For example, the following method is used. (1) Coordinate values linear with the absolute values obtained by the coordinate detection means 1702 are taken as the absolute coordinates of the cursor 1902. (2) The increase or decrease of the coordinates obtained by the coordinate detection means 1702 are added to or subtracted from the absolute coordinates of the cursor 1902.

(Step 2205) When the coordinate detection means 1702 is in a pressed condition, the process proceeds to step 2208. Otherwise, the process proceeds to step 2206.

(Step 2206) Information indicating an unpressed condition is output at the coordinate output terminal 1704.

(Step 2207) The cursor generating means 1705 generates an image with the cursor 1902 changed to a one indicating an unpressed condition. The generated image is fed to the image generating means 1707 for image synthesis, and the synthesized image is displayed on the display means 1708. The image with the cursor 1902 changed to the one indicating an unpressed condition is thus displayed. The process returns to step 2201.

(Step 2208) Information indicating a pressed condition is output at the coordinate output terminal 1704.

(Step 2209) The cursor generating means 1705 generates an image with the cursor 1902 changed to a one indicating a pressed condition. The generated image is fed to the image synthesizing means 1707 for image synthesis, and the synthesized image is displayed on the display means 1708. The image with the cursor 1902 changed to the one indicating a pressed condition is thus displayed. The process returns to step 2201.

The prior art device described above, however, has required that a special pointing means with built-in pressing detection means be used as the pointing means, and it has not been possible to use a part of a human body, such as a finger, as the pointing means. Therefore, a preparatory action to hold the special pointing means with a hand has been necessary before an operation can be started. As a result, when the operation is performed intermittently with each step lasting for a short duration of time, the time required for the preparatory action has reduced the work efficiency.

Furthermore, since the pressing detection means is built into the pointing means, if the stroke of the pressing detection means is long, the feel when it is pressed by the pointing means is unnatural as compared with ordinary writing tools, resulting in an unpleasant feel. On the other hand, if the stroke is short, an erroneous operation tends to occur since tactile feel enough to distinguish between pressed and unpressed conditions cannot be obtained.

Moreover, for users who have no experience in operating the prior art input device, it has not been possible to understand intuitively that the cursor position changes in accordance with the position of the pointing device on the coordinate detection means.

It is an object of the present invention to overcome the above enumerated deficiencies of the prior art by providing an input device that is natural to operate and reduces user fatigue, and whose method of operation can be acquired intuitively.

SUMMARY OF THE INVENTION

According to the present invention, there is provided an input device comprising: coordinate input means for outputting one- or higher-dimensional coordinates of an object placed in close proximity thereto or in contact therewith and pressed or not-pressed information indicating whether said object is pressed or not pressed thereon; and cursor generating means for accepting at inputs thereof said coordinates and said pressed or not-pressed information output from said coordinate input means, and for outputting an image containing therein a cursor representing said coordinates, wherein said cursor generating means repositions said cursor in accordance with said input coordinates and also changes the external appearance of said cursor on the basis of said pressed or not-pressed information.

According to the present invention, coordinate input means outputs one- or higher-dimensional coordinates of an object placed in close proximity thereto or in contact therewith and pressed or not-pressed information indicating whether said object is pressed or not pressed thereon, and cursor generating means accepts at its inputs the coordinates and the pressed or not-pressed information output from the coordinate input means, and outputs an image containing therein a cursor representing the coordinates. The cursor generating means repositions the cursor in accordance with the input coordinates and also changes the external appearance of the cursor on the basis of the pressed or not-pressed information.

According to another mode of the present invention, there is provided an input device comprising: coordinate input means for outputting one- or higher-dimensional coordinates of an object placed in close proximity thereto or in contact therewith, pressed or not-pressed information indicating whether said object is pressed or not pressed thereon, and coordinate detected or not-detected information indicating whether the coordinates of said object are detected or not; and cursor generating means for accepting at inputs thereof said coordinates, said pressed or not-pressed information, and said coordinate detected or not-detected information output from said coordinate input means, and for outputting an image containing therein a cursor representing said coordinates, wherein said cursor generating means repositions said cursor in accordance with said input coordinates and also changes the external appearance of said cursor on the basis of said pressed or not-pressed information and said coordinate detected or not-detected information.

According to another mode of the present invention, there is provided an input device comprising: coordinate input means for outputting one- or higher-dimensional absolute coordinates of an object placed in close proximity thereto or in contact therewith and pressed or not-pressed information indicating whether said object is pressed or not pressed thereon; and cursor generating means for accepting at inputs thereof said coordinates and said pressed or not-pressed information output from said coordinate input means, and for outputting an image containing therein a cursor representing said coordinates, wherein said cursor generating means repositions said cursor in accordance with said input absolute coordinates and also changes the external appearance of said cursor on the basis of said pressed or not-pressed information.

According to another mode of the present invention, there is provided an input device comprising:

coordinate input means for outputting one- or higher-dimensional absolute coordinates of an object placed in close proximity thereto or in contact therewith, pressed or not-pressed information indicating whether said object is pressed or not pressed thereon, and coordinate detected or not-detected information indicating whether the coordinates of said object are detected or not; and cursor generating means for accepting at inputs thereof said coordinates, said pressed or not-pressed information, and said coordinate detected or not-detected information output from said coordinate input means, and for outputting an image containing therein a cursor representing said coordinates, wherein said cursor generating means repositions said cursor in accordance with said input absolute coordinates and also changes the external appearance of said cursor on the basis of said pressed or not-pressed information and said coordinate detected or not-detected information.

According to the above present invention, there is provided the input device, wherein the external appearance of said cursor represents schematically the shape of said object placed in close proximity to or in contact with said coordinate input means.

According to another mode of the present invention, there is provided an input device comprising:

coordinate input means for outputting an information of one- or higher-dimensional relative coordinates of a close or contacting object, the relative coordinates being determined with respect to the absolute coordinates which is obtained from a position of the object when the position is detected by the coordinate input means, and also outputting pressed or not-pressed information indicating whether said object is pressed or not pressed thereon; and cursor generating means for accepting at inputs thereof said relative coordinates and said pressed or not-pressed information output from said coordinate input means, and for outputting an image containing therein a cursor representing said coordinates, wherein said cursor generating means repositions said cursor in accordance with said relative coordinates and also changes the external appearance of said cursor on the basis of said pressed or not-pressed information.

According to the above present invention, there is provided the input device, wherein the external appearance of said cursor represents schematically the shape of said object placed in close proximity to or in contact with said coordinate input means.

According to the above present invention, there is provided the input device, further comprising area definition generating means for accepting at an input thereof said coordinate detected or not-detected information output from said coordinate input means, and for outputting an image containing therein an area definition defining a movable area of said cursor when said coordinate detected or not-detected information indicates the detection of said coordinates, and image generating means for accepting at inputs thereof the image output from said area definition generating means and the image output from said cursor generating means, and for producing an image by superimposing said input images one over the other for output.

According to the above present invention, there is provided the input device, further comprising area definition generating means for generating and outputting an image containing therein an area definition defining a movable area of said cursor which, when the absolute coordinates of said object are obtained by said coordinate input means, is displayed within a prescribed display screen in accordance with a predetermined rule using said absolute coordinates, and image generating means for outputting a synthesized image synthesized by superimposing the image output from said cursor generating means over the image output from said area definition generating means, wherein said cursor generating means outputs an image of said cursor that moves within said movable area in accordance with said relative coordinates, starting from the initial position thereof defined by a predetermined rule within said movable area in said image to be synthesized.

According to the above present invention, there is provided the input device, further comprising operation detection means for accepting at inputs thereof from said coordinate input means the one- or higher-dimensional coordinates of said proximate or contacting object and the pressed or not-pressed information indicating whether said coordinate input means is pressed by said object, and for outputting a displacement of said coordinates made during the pressing and a moving speed of said coordinates at the time when a transition is made from a pressed condition to an unpressed condition, film generating means for accepting at an input thereof the output of said operation detection means and for outputting a film pictorially representing a pattern of a movie film, and image reproducing means for accepting at an input thereof the output of said operation detection means and for reproducing and outputting a desired position of stored moving images, wherein when the output of said operation detection means represents the displacement, said film generating means changes the pattern of said film to a pattern indicating said film having moved by a distance corresponding to said displacement, and when the output of said operation detection means represents the moving speed, said film generating means continues changing the pattern so that said film continues to move at said moving speed, while when the output of said operation detection means represents the displacement, said image reproducing means moves said reproduced and output image position by a distance corresponding to said displacement, and when the output of said operation detection means represents the moving speed, said image reproducing means continues to reproduce said reproduced and output image at a speed corresponding to said moving speed.

Furthermore, according to the above invention, the pressing detection means outputs the coordinates and the pressing information, and the cursor generating means repositions the cursor in accordance with the input coordinates and also changes the external appearance of the cursor in accordance with the input pressing information. Since the means for detecting the pressing information and the means for detecting the coordinates are constructed integrally, coordinates can be input directly using a human body part such as a finger.

This achieves an input device that is natural to operate and that reduces user fatigue.

According to another mode of the present invention, there is provided an input device comprising: input means, having a prescribed input surface, for inputting information; and display image control means which, based on a moving speed of an object moving on said input surface before or at the point in time that said object is released from said input surface, controls the movement of an image displayed on a prescribed screen after said point in time.

According to the present invention, input means with a prescribed input surface is used to input information, and based on the moving speed of an object moving on the input surface before or at the point in time that the object is released from the input surface, display image control means controls the movement of an image displayed on a prescribed screen after that point in time.

According to the above present invention, there is provided the input device, wherein the display produced on said screen is related to the moving condition of said object when said object is not released from said input surface.

BRIEF DESCRIPTION OF THE DRAWINGS

FIG. 16 is a flowchart for explaining the operation of the fourth embodiment of the invention;

DESCRIPTION OF THE PREFERRED EMBODIMENTS

The preferred embodiments of the present invention will now be described in detail below with reference to the accompanying drawings.

First, we will describe the configuration of a first embodiment which corresponds to the invention of claim 1, claim 2, claim 3, claim 4, claim 5, claim 6, and claim 7.

Figure 1:
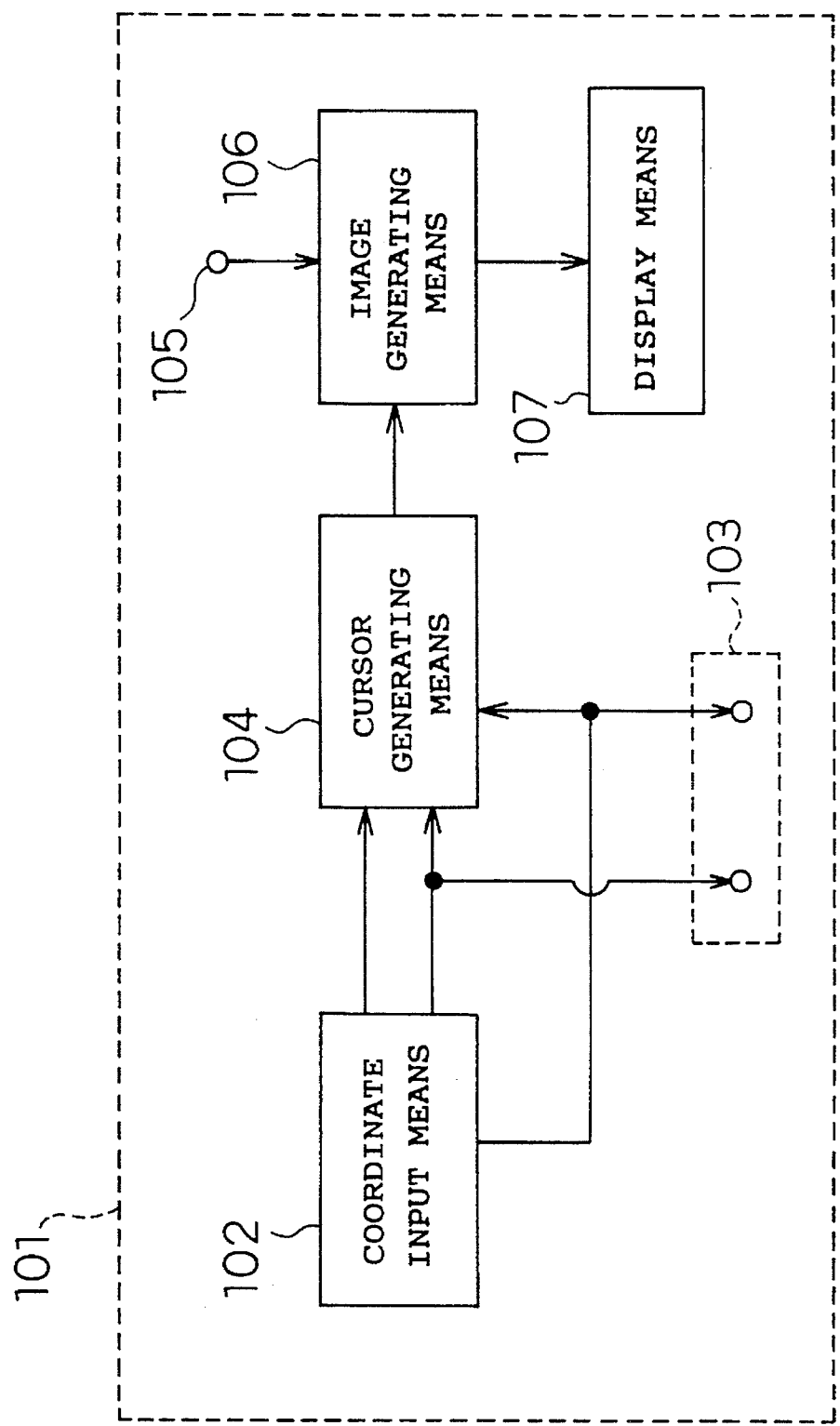
FIG. 1 is a block diagram showing the configuration of a first embodiment of the invention.

FIG. 1 is a block diagram showing a simplified form of the configuration of the first embodiment.

In the figure, reference numeral 101 represents an input device, which comprises a coordinate input means 102, a coordinate output terminal 103, a cursor generating means 104, an image input terminal 105, an image synthesizing means 106, and a display means 107.

The coordinate input means, indicated at 102, monitors the position of an object placed in close proximity to a coordinate detection means 202. The coordinate input means 102 outputs the coordinates of the object under detection, detection information indicating whether the coordinates of the object under detection are detected or not, and pressing information indicating whether the coordinate input means 102 is being pressed by the object under detection.

Figure 2:
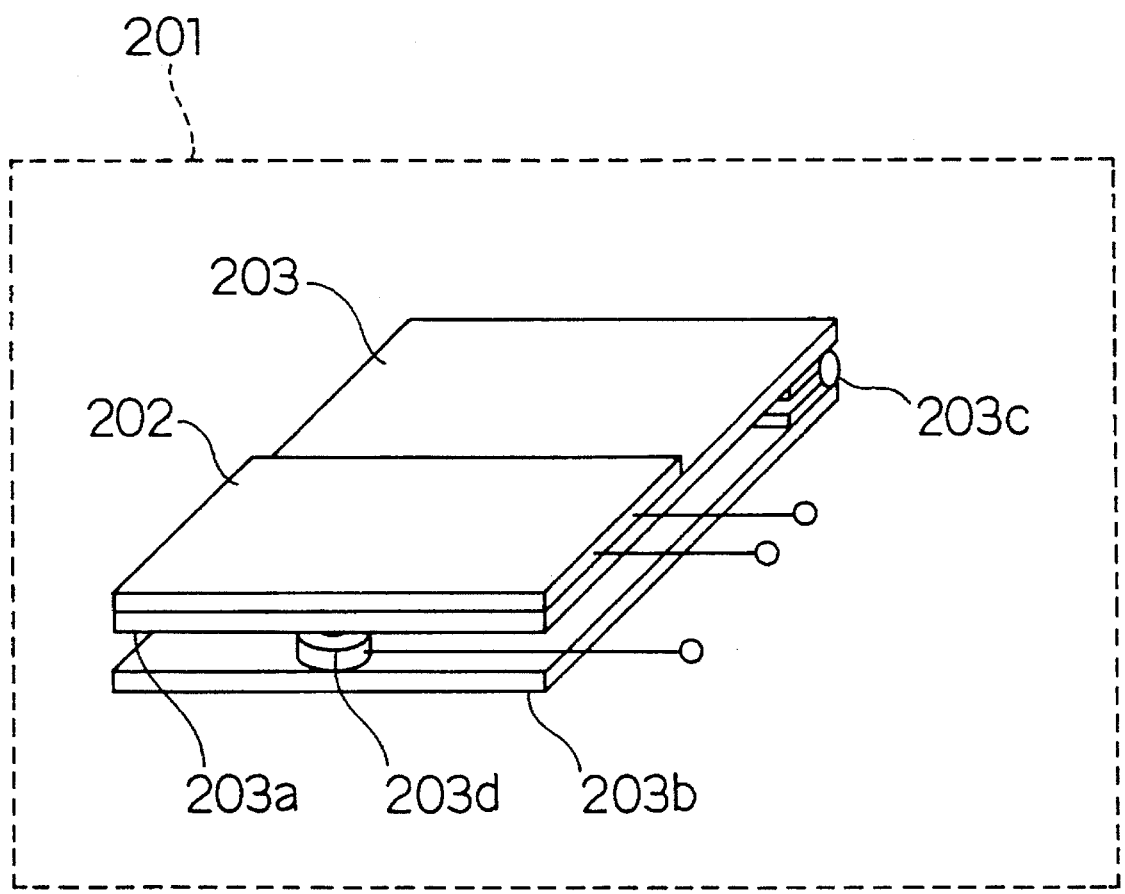
FIG. 2 is a diagram showing the structure of a coordinate input means according to the first embodiment of the invention.

An example of the structure of the coordinate input means 102 will be described in detail below with reference to drawing. FIG. 2 shows an example of the structure of the coordinate input means.

Reference numeral 201 designates the coordinate input means. The coordinate input means 201 detects one- or higher-dimensional coordinates of an object placed in close proximity thereto or in contact therewith and a force (hereinafter called the "pressing force") applied vertically to the coordinate system (corresponding to the coordinate detection means 202) to be detected by the coordinate input means. The coordinate input means 201 outputs the detected coordinates, information indicating whether the coordinates are detected (hereinafter called the "detection information"), and information indicating whether the pressing force is applied (hereinafter called the "pressing information).

One structural example of the coordinate input means will be described below. The coordinate input means 201 comprises, for example, a coordinate detection means 202 and a pressing detection means 203.

The coordinate detection means, indicated at 202, detects one- or higher-dimensional coordinates of an object placed in close proximity thereto or in contact therewith. The outputs of the coordinate detection means 202 consist of the detection information and the detected coordinates.

When an electrostatic capacitance tablet is used as the coordinate detection means 202, for example, the coordinate detection means 202 can detect an electric conductor whose contact portion is grounded. Since a part of a human body can be regarded as an electric conductor, such a part can be used as an object to be detected by the electrostatic capacitance tablet.

When the object to be detected is sufficiently far apart from the coordinate detection means, their coordinates may take indefinite values due to the effects of external noise, etc. By ignoring such indefinite coordinate values as unreliable ones by using the detection information, the effects of noise, etc. can be eliminated.

Further, a resistive film tablet can be used as the coordinate detection means 202. In that case, a pointer is required that can provide a sufficiently small contact area when it is brought into contact with the coordinate detection means 202. A human finger or a pen-like plastic rod is an object that can provide a sufficiently small contact area, and therefore, can be used as the object to be detected.

The pressing detection means, indicated at 203, detects the pressing force applied to the coordinate detection means 202. The output of the pressing detection means 203 provides the pressing information indicating whether the pressing force is detected or not.

The pressing detection means 203 can be constructed using a movable plate 203a, a fixed plate 203b, a hinge 203c, and a pressure detection means 203d.

The movable plate 203a forms the top plate of the pressing detection means 203 and is fixed to the coordinate detection means 202.

The fixed plate 203b forms the bottom plate of the pressing detection means 203.

The hinge 203c has two ends that allow movement in a circular arc with the application of a small force. One end is joined to the movable plate 203a and the other to the fixed plate 203b. This construction allows the movable plate 203a and the fixed plate 203b to move in a circular arc about the hinge 203c.

The pressure detection means 203d is located between the movable plate 203a and the fixed plate 203b so that it can accept the pressing force applied to the movable plate 203a. The pressure detection means 203d detects the pressing when a pressing force greater than a certain level is applied, and outputs the pressing information indicating that the pressing is detected. When a pressing force is applied to the coordinate detection means 202, the movable plate and fixed plate are moved closer to each other about the hinge 203c, thus pressing the pressure detection means 203d. In this manner, the pressing detection means 203 can detect the pressing on the coordinate detection means 202.

Here we consider the case where for the coordinate detection means 202 a method is employed in which coordinates can be detected only when a force greater than a certain level is applied, as in the case of a resistive film tablet. In this case, the force to be applied to the pressure detection means 203d for detection must be sufficiently greater than the pressing force by which the coordinate detection means 202 can detects the coordinates. For example, a suitable press switch may be used as the pressure detection means 203d.

Also, when the area of the coordinate detection means 202 is sufficiently small, the pressing detection means 203 can be constructed using only a press switch.

The coordinate output terminal, indicated at 103, is coupled to the coordinates and the pressing information that the coordinate input means 102 outputs. The coordinate output terminal 103 is used to supply the position information of the detected object obtained by the input device 101 to an external device.

The cursor generating means, indicated at 104, accepts at its inputs the detection information, coordinates, and pressing information output from the coordinate input means 102, and generates an image which is output.

Figure 3A:
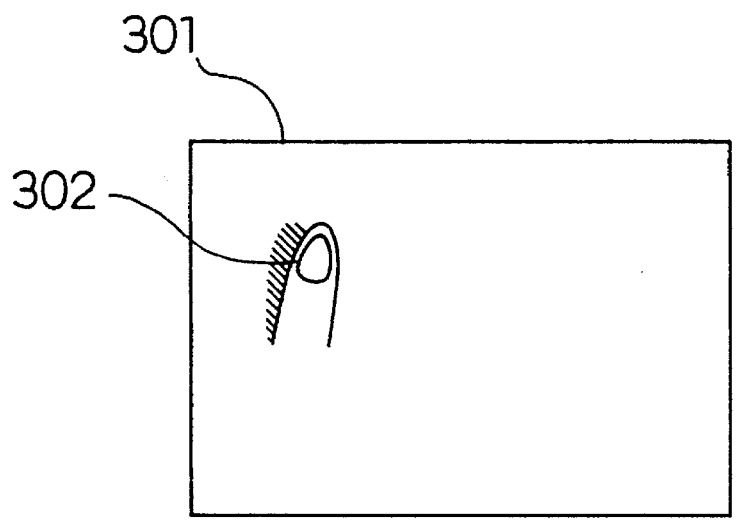
FIGS. 3(a)–3(c) show examples of images according to the first embodiment of the invention.
Figure 3B:
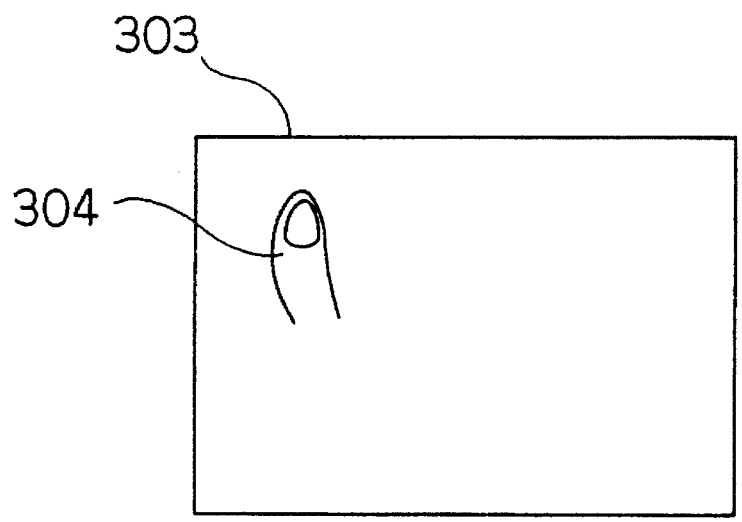
Figure 3C:
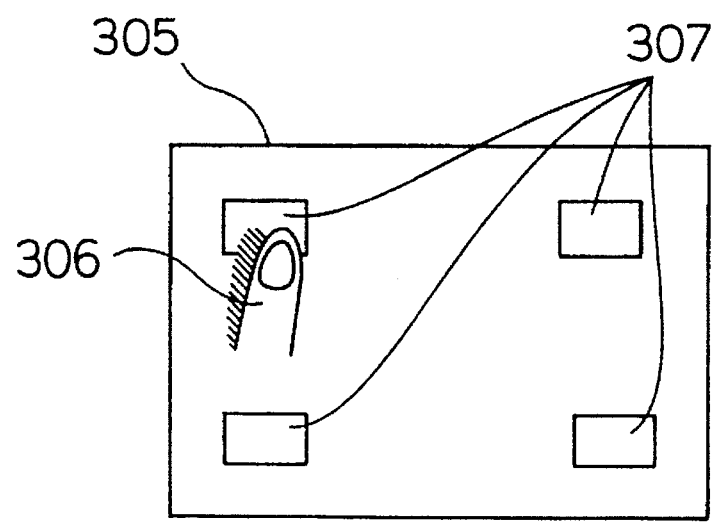

Output examples of the cursor generating means 104 will be described with reference to FIG. 3.

Reference numeral 301 shows an example of an image that the cursor generating means 104 outputs when the coordinates are detected but no pressing is present.

Reference numeral 302 is a cursor. The cursor 302 has a shape that resembles the object under detection by the input device 101. For example, when the object under detection is a finger, the cursor is shaped as a pictorial symbol schematically representing the shape of a finger. When the coordinates are detected but no pressing is present, shading or other technique is used to give a floating appearance representing the state of the object detected.

Reference numeral 303 shows an example of an image that the cursor generating means 104 outputs when the pressing is detected.

Reference numeral 304 is a cursor. When the pressing is present, a pictorial symbol having a deformed appearance as if deformed by the pressing force is used to represent the cursor.

The image input terminal, indicated at 105, is used to connect the input device 101 to an image output of an external device.

The image generating means, indicated at 106, accepts at its inputs the output of the cursor generating means 104 and the output of the image input terminal 105. The image synthesizing means 106 outputs an image synthesized by superimposing an image output from the cursor generating means 104 over an image output from the image input terminal 105.

An example of the image generated by the image synthesizing means 106 will be described with reference to drawing.

Figure 20:
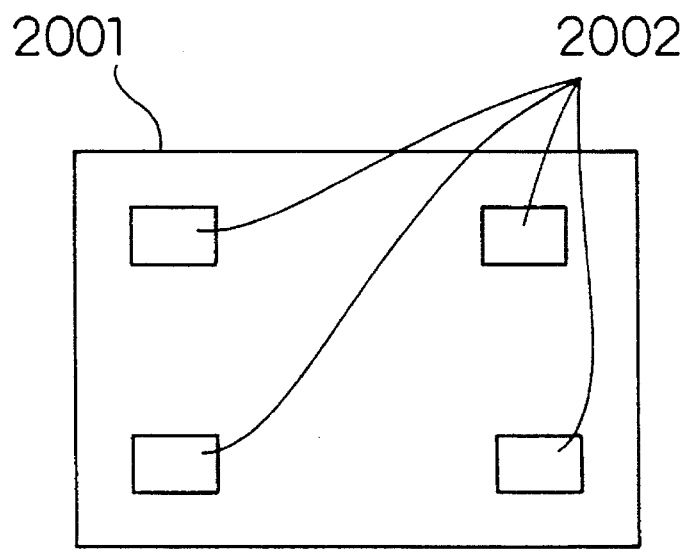
FIG. 20 is a diagram showing an example of an image input at an image input terminal of the prior art device.
Figure 21:
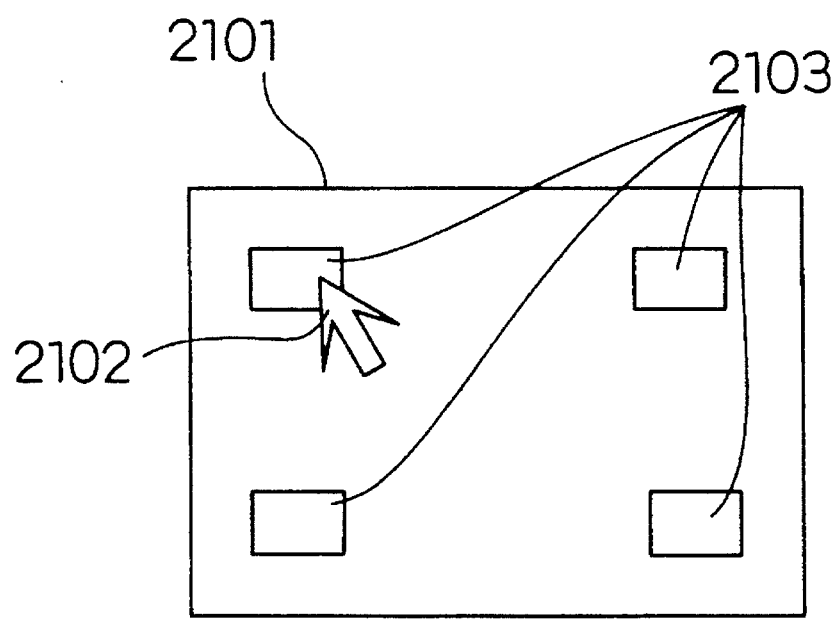
FIG. 21 is a diagram showing an example of an image output from an image generating means of the prior art device.
Figure 22:
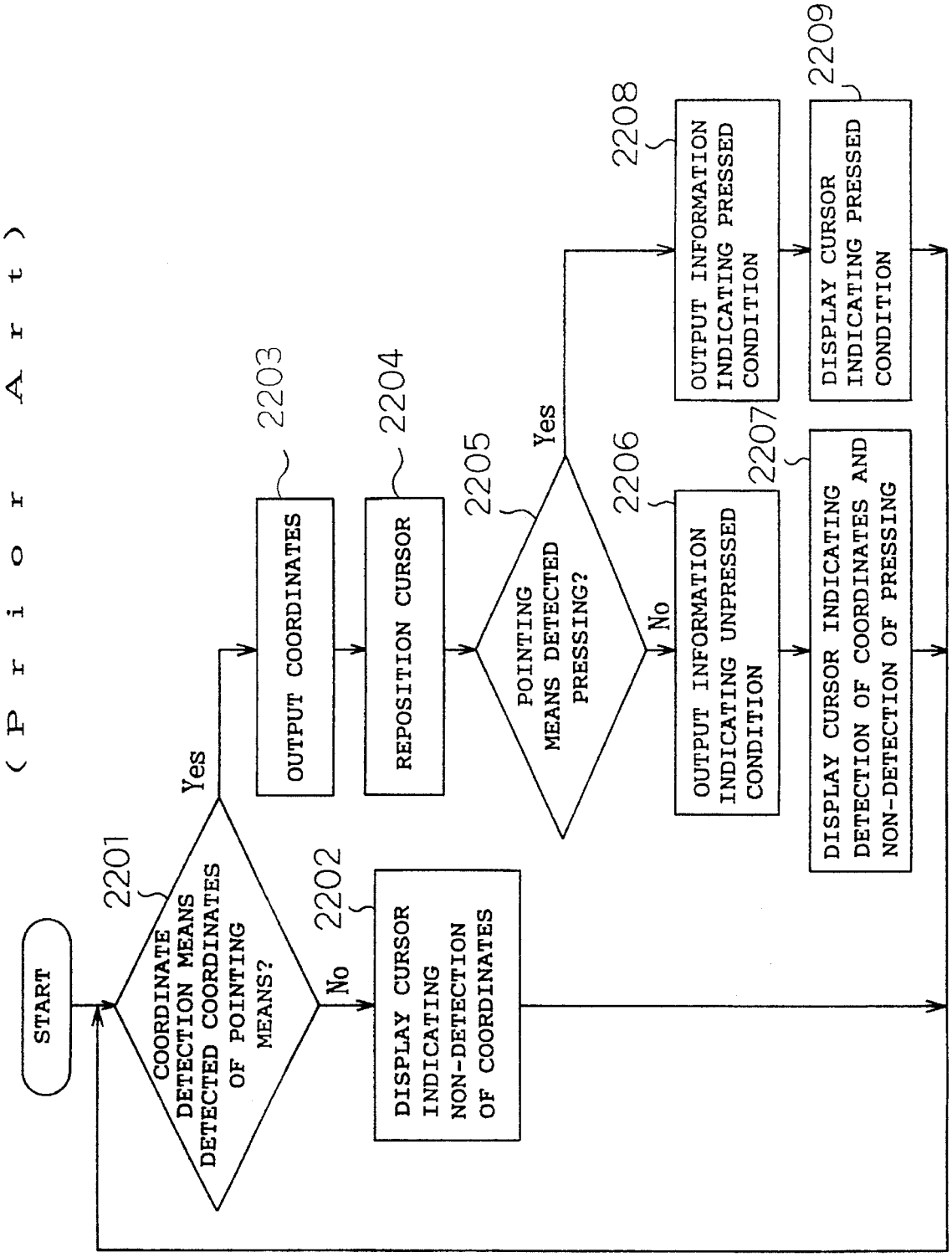
FIG. 22 is a flowchart for explaining the operation of the prior art device.

Reference numeral 305 indicates the image that the image generating means 106 outputs when the output of the cursor generating means is the image 301 and the output of the image input terminal 105 is the image 2001 (see FIG. 20).

Indicated at 306 is the cursor which is the same as the cursor 302 included in the image 301 output from the cursor generating means 104.

Reference numeral 307 represents image portions included in the image 2001 input at the image input terminal 105.

The display means, indicated at 107, accepts at its input the image output from the image generating means 106. The display means 107 displays the input image. The display means 107 is, for example, a CRT display.

Figure 4:
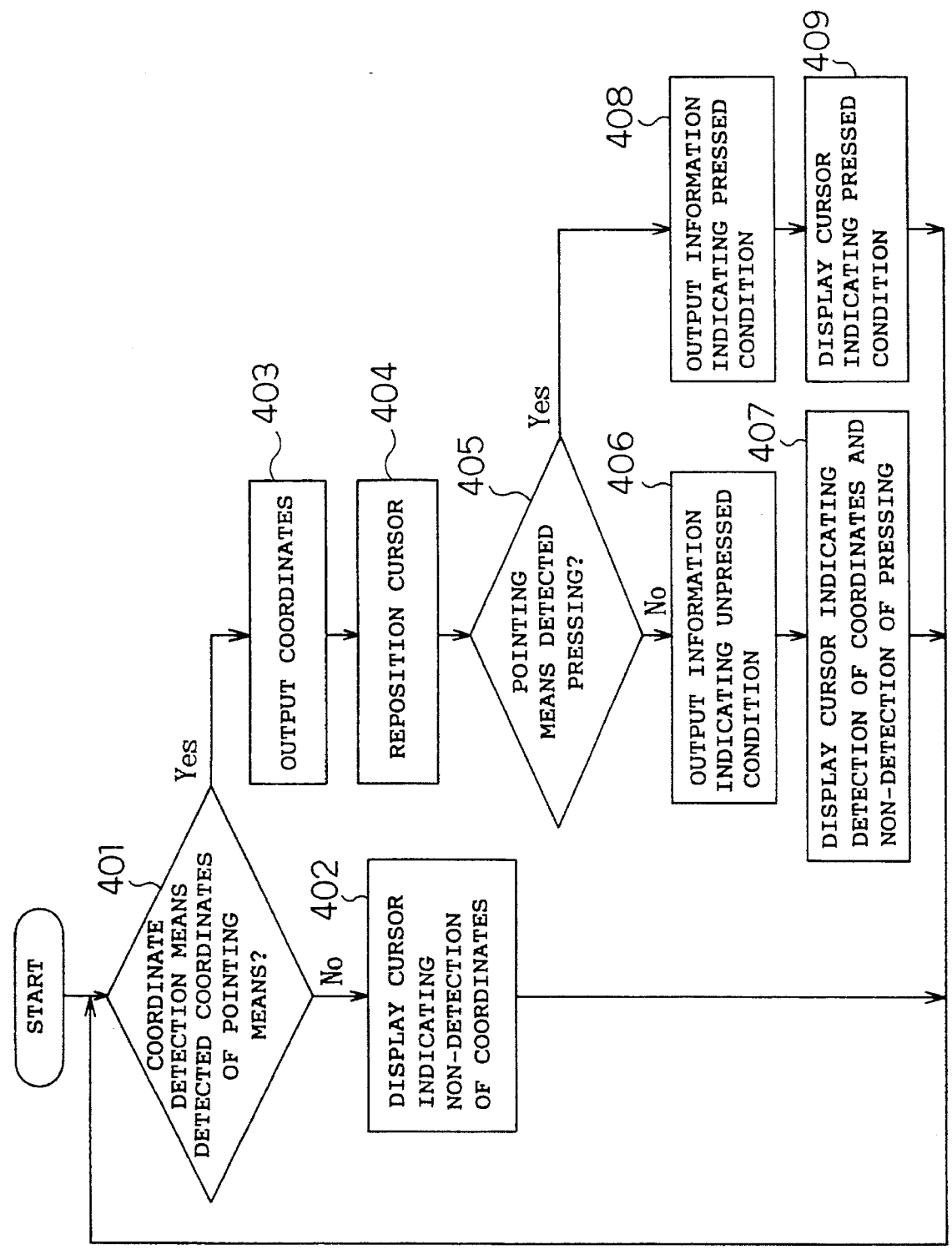
FIG. 4 is a flowchart for explaining the operation of an input device according to the first embodiment of the invention.

Next, the operation of the first embodiment of the invention will be described with reference to the flowchart shown in FIG. 4.

(Step 401) When the coordinate input means 102 has detected the coordinates of the pointing means, the process proceeds to step 403.

(Step 402) The cursor generating means 104 generates an image with the cursor changed to a pictorial symbol that indicates non-detection of the coordinates. The generated image is fed to the image generating means 106 for image synthesis, and the synthesized image is displayed on the display means 107. The process returns to step 401.

(Step 403) The coordinates obtained in step 402 are output at the output terminal.

(Step 404) The cursor generating means 104 changes the position of the cursor in accordance with the coordinates output from the coordinate detection means 202. The generated image is then fed to the image generating means 106 for image synthesis, and the synthesized image is displayed on the display means 107. The image with the cursor repositioned accordingly is thus displayed on the screen. The amount of cursor movement is determined by the pointer's coordinates obtained by the coordinate detection means 202. For example, the absolute coordinates obtained by the coordinate detection means 202 correspond to the absolute coordinates of the cursor displayed on the screen. As an example, when the coordinates obtained by the coordinate detection means 202 designate a point in the upper left part of the surface of the coordinate detection means 202, the cursor is displayed in the upper left part of the display screen. When that point is moved from the upper left to the lower right on the surface of the coordinate detection means 202, the cursor likewise moves from the upper left to the lower right on the display screen. Further, when the coordinates are being detected by the coordinate detection means 202, the amount of displacement of the coordinates under detection corresponds to the amount of displacement of the absolute coordinates of the cursor. As an example, when the coordinates under detection are shifted to the right by a distance l, the coordinates of the cursor displayed on the screen shift to the right on the screen by a distance corresponding to the distance l. In this case, however, the absolute coordinates of the cursor at the start of the movement need not necessarily correspond to the absolute coordinates on the surface of the coordinate detection means 202.

(Step 405) When the coordinate detection means 202 is in a pressed condition, the process proceeds to step 408.

(Step 406) Pressing information whose value indicates an unpressed condition is output at the output terminal.

(Step 407) The cursor generating means 104 generates an image with the cursor changed to a one used when the coordinates are detected but no pressing is present. The generated image is fed to the image generating means 106 for image synthesis, and the synthesized image is displayed on the display means 107. The image with the cursor changed to the one indicating an unpressed condition is thus displayed. The process returns to step 401.

(Step 408) Information indicating a pressed condition is output at the output terminal.

(Step 409) The cursor generating means 104 generates an image with the cursor changed to a one indicating a pressed condition. The generated image is fed to the image synthesizing means 106 for image synthesis, and the synthesized image is displayed on the display means 107. The image with the cursor changed to the one indicating a pressed condition is thus displayed. The process returns to step 401. In this embodiment, no specification is given about the arrangement of the input surface of the coordinate input means relative to the display surface of the display means, but it will be recognized that an input device whose method of operation is easier to understand can be constructed by arranging the coordinate input means over the surface of the display means.

Next, the configuration of a second embodiment corresponding to the invention of claim 8 will be described.

Figure 5:
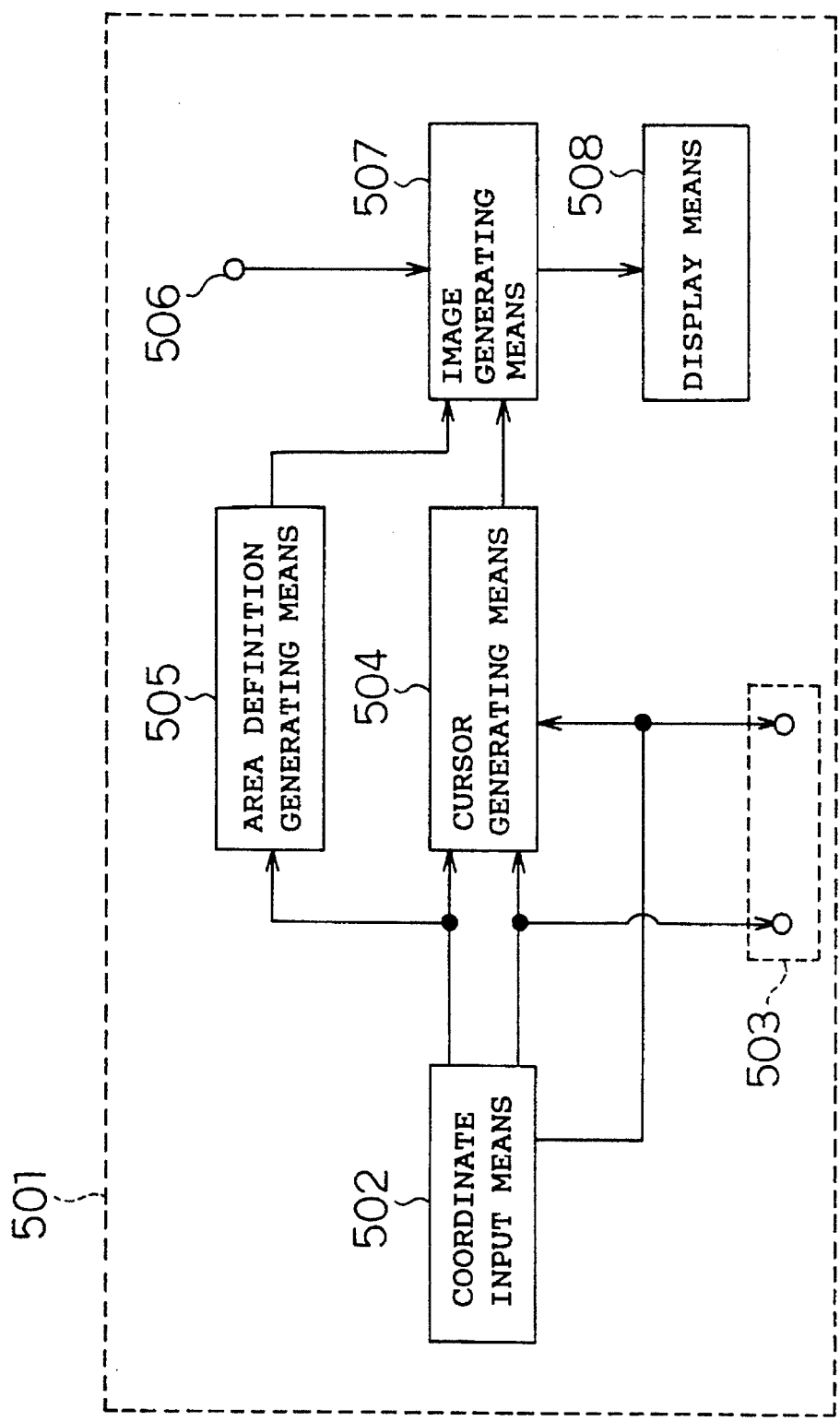
FIG. 5 is a block diagram showing the configuration of a second embodiment of the invention.

FIG. 5 is a block diagram showing a simplified form of the configuration of the second embodiment. Reference numeral 501 indicates an input device, which comprises a coordinate input means 502, a coordinate output terminal 503, a cursor generating means 504, an image input terminal 506, an image generating means 507, and a display means 508.

The coordinate input means, indicated at 502, monitors the position of an object placed in close proximity to a coordinate detection means. The coordinate input means 502 outputs the coordinates of the object under detection, detection information indicating whether the coordinates of the object under detection are detected, and pressing information indicating whether the coordinate input means 502 is being pressed by the object under detection.

Figure 6:
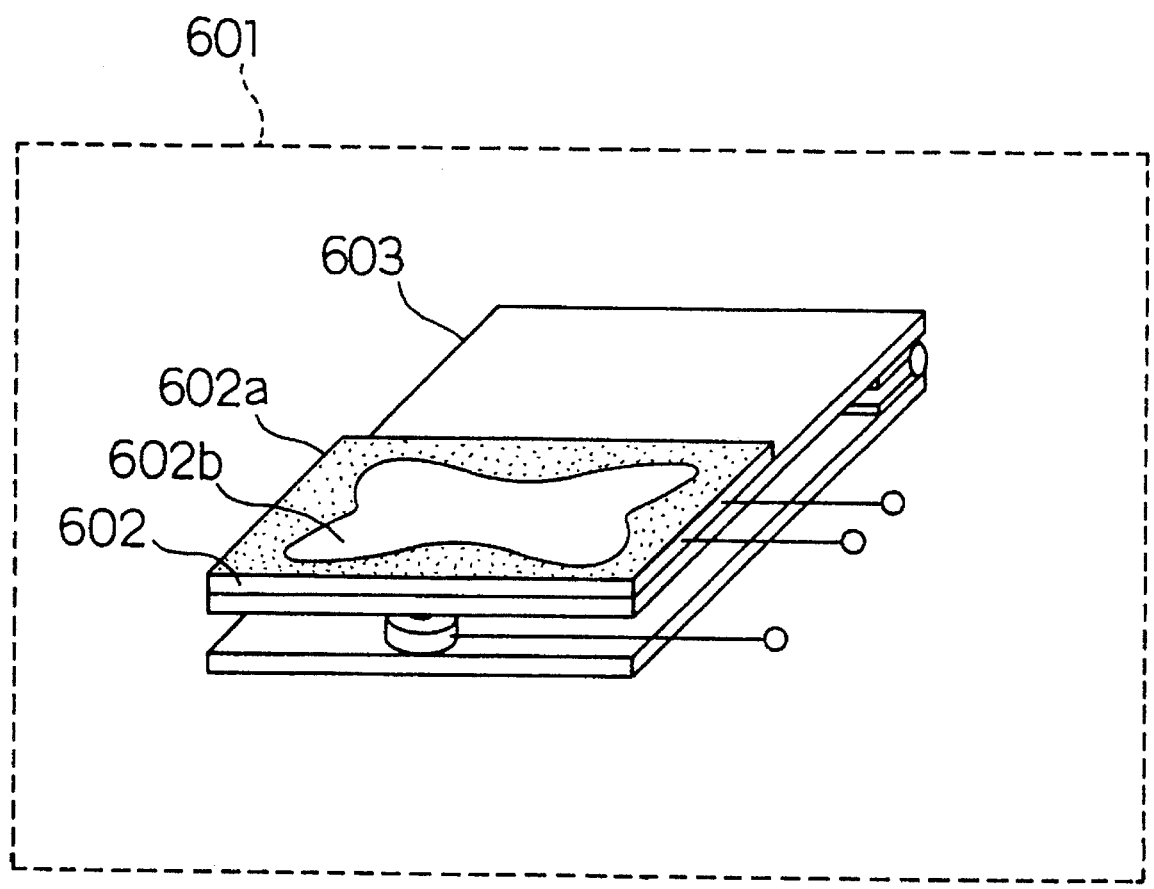
FIG. 6 is a diagram showing the structure of a coordinate input means according to the second embodiment of the invention.

An example of the structure of the coordinate input means 502 will be described in detail below with reference to drawing. FIG. 6 is a schematic diagram showing the structure of the coordinate input means 502.

Reference numeral 601 is the coordinate input means, which comprises a coordinate detection means 602 and a pressing detection means 603.

The coordinate detection means, indicated at 602, detects one- or higher-dimensional coordinates of an object placed in close proximity thereto or in contact therewith. The outputs of the coordinate detection means 202 consist of the detection information, which indicates whether the coordinates are detected, and the detected coordinates.

The coordinate detection means 602 comprises a coordinate detection plate 602a and an area limiting means 602b.

The coordinate detection plate, indicated at 602a, may be constructed from a part equivalent to the coordinate detection means 202 used in the first embodiment.

The area limiting means, indicated at 602b, has an opening and is overlaid on the coordinate detection plate 602a. The area limiting means 602b limits the operating area of the coordinate detection means 602 to the portion not covered by the area limiting means 602b, that is, to the area of the opening formed in the area limiting means 602b.

The pressing detection means, indicated at 603, detects the pressing force applied to the coordinate detection means 602. The output of the pressing detection means provides the pressing information indicating whether the pressing force is detected or not. The pressing detection means may be constructed from a part equivalent to the pressing detection means used in the first embodiment.

The coordinate output terminal, indicated at 503, is coupled to the coordinates and pressing information output from the coordinate input means 502. The coordinate output terminal 503 is used to supply the position information of the detected object obtained by the input device 501 to an external device.

The cursor generating means, indicated at 504, accepts at its inputs the detection information, coordinates, and pressing information output from the coordinate input means 502, and generates an image which is output.

Reference numeral 505 indicates an area definition generating means. The area definition generating means 505 accepts at its input the detection information output from the coordinate input means 502. When the coordinates are detected, the area definition generating means 505 generates an image of a frame defining a movable range of a cursor 702, and outputs the generated image.

Figure 7A:
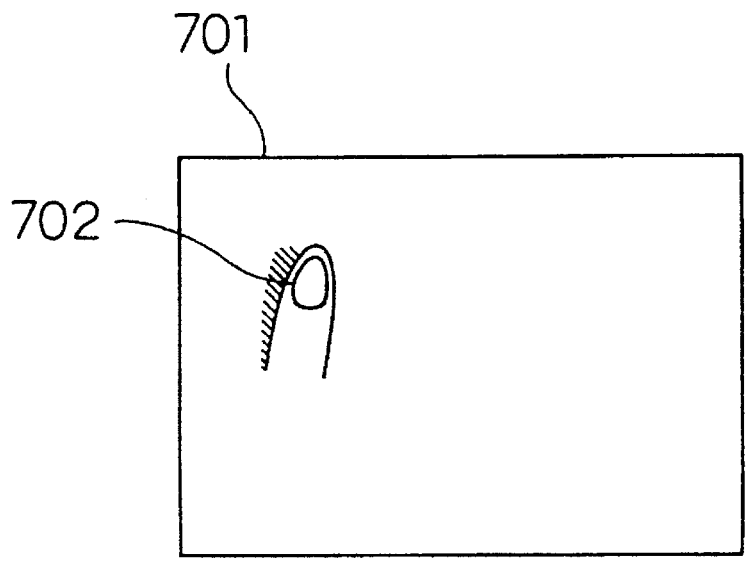
FIGS. 7(a)–7(c) show examples of images according to the second embodiment of the invention.
Figure 7B:
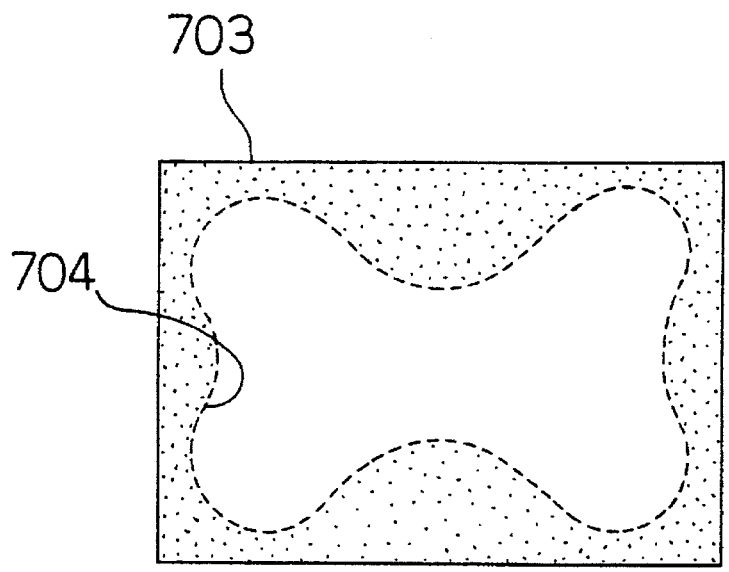
Figure 7C:
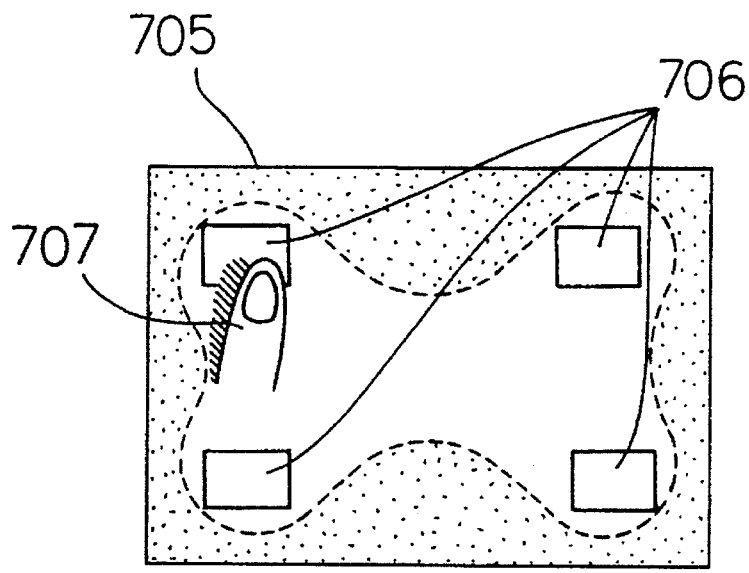

Output examples of the cursor generating means 504 will be described with reference to FIG. 7.

Reference numeral 701 shows an example of an image that the cursor generating means 504 outputs when the coordinates are detected but no pressing is present.

Reference numeral 702 is the cursor. A cursor similar to the one used in the first embodiment may be used as the cursor 702 in this example.

The operation of the area definition generating means 505 will be described below with reference to FIG. 7. Reference numeral 703 indicates the image that the area definition generating means 505 outputs. Reference numeral 704 indicates an area defining means which defines the movable range of the cursor 702. The area defining means has a shape that matches the shape of the operating area limiting means 602*b*. This enables the user to recognize easily that by moving the finger within the operating area limiting means, the cursor 702 can be moved within the area defined by the area defining means.

The image input terminal, indicated at 506, is used to connect the input device 501 to an image output of an external device.

The image generating means, indicated at 507, accepts at its inputs the output of the cursor generating means 504, the output of the area definition generating means 505, and the output of the image input terminal 506. The image synthesizing means 507 outputs an image synthesized by superimposing an image output from the cursor generating means 504 over an image synthesized by superimposing the image output from the area definition generating means 505 over an image input from the image input terminal 506. An example of the image generated by the image synthesizing means 507 will be described with reference to drawing. Reference numeral 705 indicates the image that the image synthesizing means 507 outputs when the output of the cursor generating means is the image 701, the output of the area defining means is the image 703, and the output of the image input terminal 506 is the image 2001. Indicated at 707 is the cursor which is the same as the cursor 702 included in the image 701 output from the cursor generating means 504. Reference numeral 706 indicates an image included in the image 2001 input at the image input terminal 506.

The display means, indicated at 508, accepts at its input the image output from the image generating means 507. The display means 508 displays the input image. The display means 508 is, for example, a CRT display.

Figure 8:
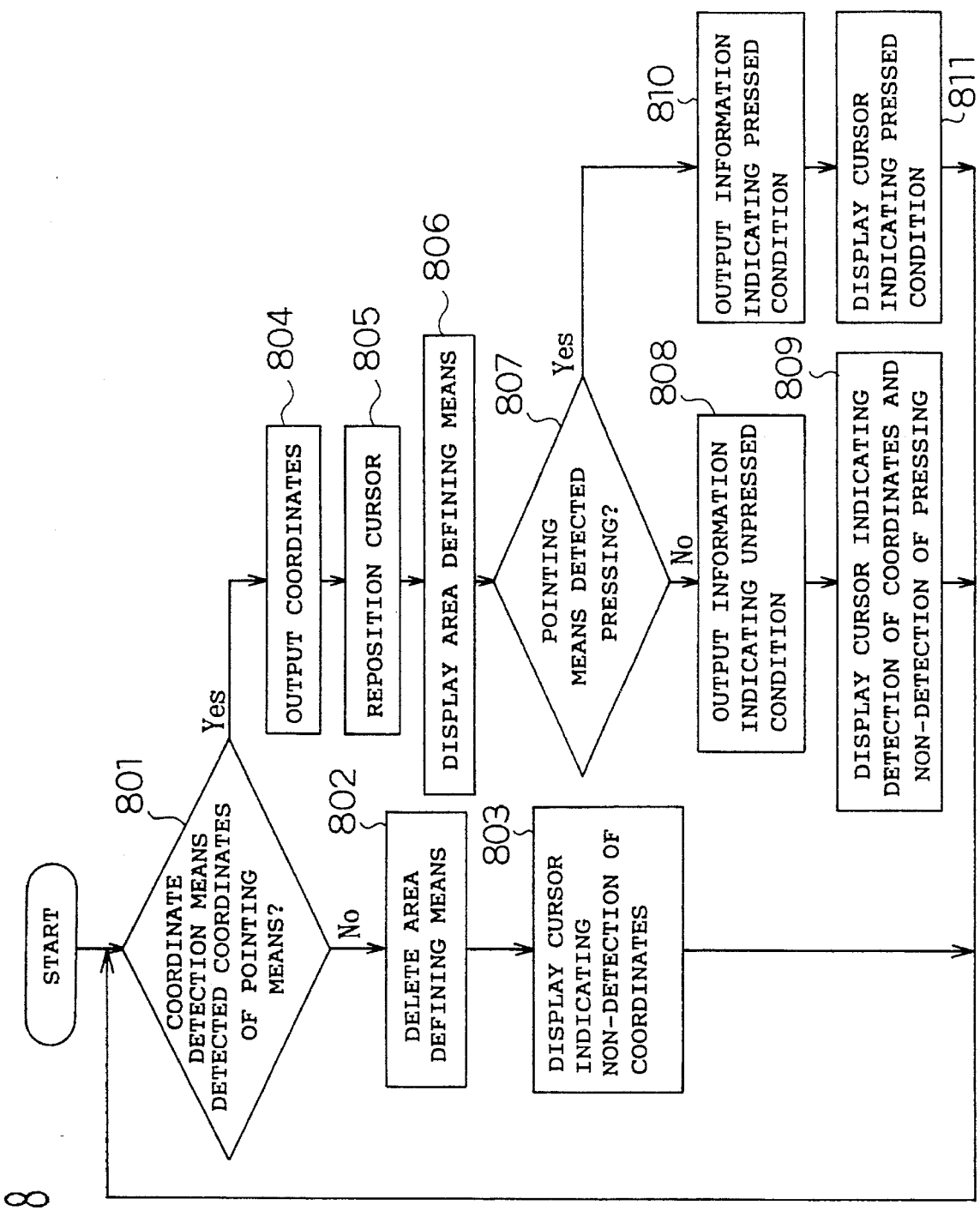
FIG. 8 is a flowchart for explaining the operation of an input device according to the second embodiment of the invention.

Next, the operation of the second embodiment of the present invention will be described with reference to the flowchart shown in FIG. 8.

(Step 801) When the coordinate input means 502 has detected the coordinates of the pointing means, the process proceeds to step 804.

(Step 802) The area definition generating means 505 generates an image with the area defining means deleted. The generated image is fed to the image generating means 507 for image synthesis, and the synthesized image is displayed on the display means 508.

(Step 803) The cursor generating means 504 generates an image with the cursor 702 changed to a pictorial symbol that indicates non-detection of the coordinates. The generated image is fed to the image generating means 507 for image synthesis, and the synthesized image is displayed on the display means 508. The process returns to step 801.

(Step 804) The coordinates obtained in step 801 are output at the output terminal.

(Step 805) The cursor generating means 504 changes the position of the cursor 702 in accordance with the coordinates output from the coordinate input means 502. The generated image is then fed to the image generating means 507 for image synthesis, and the synthesized image is displayed on the display means 508. The image with the cursor 702 repositioned accordingly is thus displayed on the screen. It should be noted here that the absolute coordinates of the cursor 702 take values that are linear with respect to the absolute coordinates obtained by the coordinate input means 502. Further, when the object whose coordinates are under detection is moved within the opening of the area limiting means 602*b* that defines the operating area of the coordinate input means 502, the cursor 702 moves precisely within the opening of the area defining means. For example, the absolute coordinates obtained by the coordinate detection means 602 correspond to the absolute coordinates of the cursor displayed on the screen. As an example, when the coordinates obtained by the coordinate detection means 602 designate a point in the upper left part of the surface of the coordinate detection means 602, the cursor is displayed in the upper left part of the display screen. When that point is moved from the upper left to the lower right on the surface of the coordinate detection means 602, the cursor likewise moves from the upper left to the lower right on the display screen. Further, when the coordinates are being detected by the coordinate detection means 602, the amount of displacement of the coordinates under detection corresponds to the amount of displacement of the absolute coordinates of the cursor. As an example, when the coordinates under detection are shifted to the right by a distance l, the coordinates of the cursor displayed on the screen shift to the right on the screen by a distance corresponding to the distance l. In this case, however, the absolute coordinates of the cursor at the start of the movement need not necessarily correspond to the absolute coordinates on the surface of the coordinate detection means 602.

(Step 806) The area definition generating means 505 generates an image containing therein the area defining means. The generated image is fed to the image synthesizing means 507 for image synthesis, and the synthesized image is displayed on the display means 508.

(Step 807) When the coordinate input means 502 is in a pressed condition, the process proceeds to step 810.

(Step 808) Information indicating an unpressed condition is output at the output terminal.

(Step 809) The cursor generating means 504 generates an image with the cursor 702 changed to a one used when the coordinates are detected but no pressing is present. The generated image is fed to the image generating means 507 for image synthesis, and the synthesized image is displayed on the display means 508. The image with the cursor 702 changed to the one indicating an unpressed condition is thus displayed on the screen. The process returns to step 801.

(Step 810) Information indicating a pressed condition is output at the output terminal.

(Step 811) The cursor generating means 504 generates an image with the cursor 702 changed to a one indicating a pressed condition. The generated image is fed to the image synthesizing means 507 for image synthesis, and the synthesized image is displayed on the display means 508. The image with the cursor 702 changed to the one indicating a pressed condition is thus displayed on the screen. The process returns to step 801.

Next, the configuration of a third embodiment corresponding to the invention of claim 9 will be described.

Figure 9:
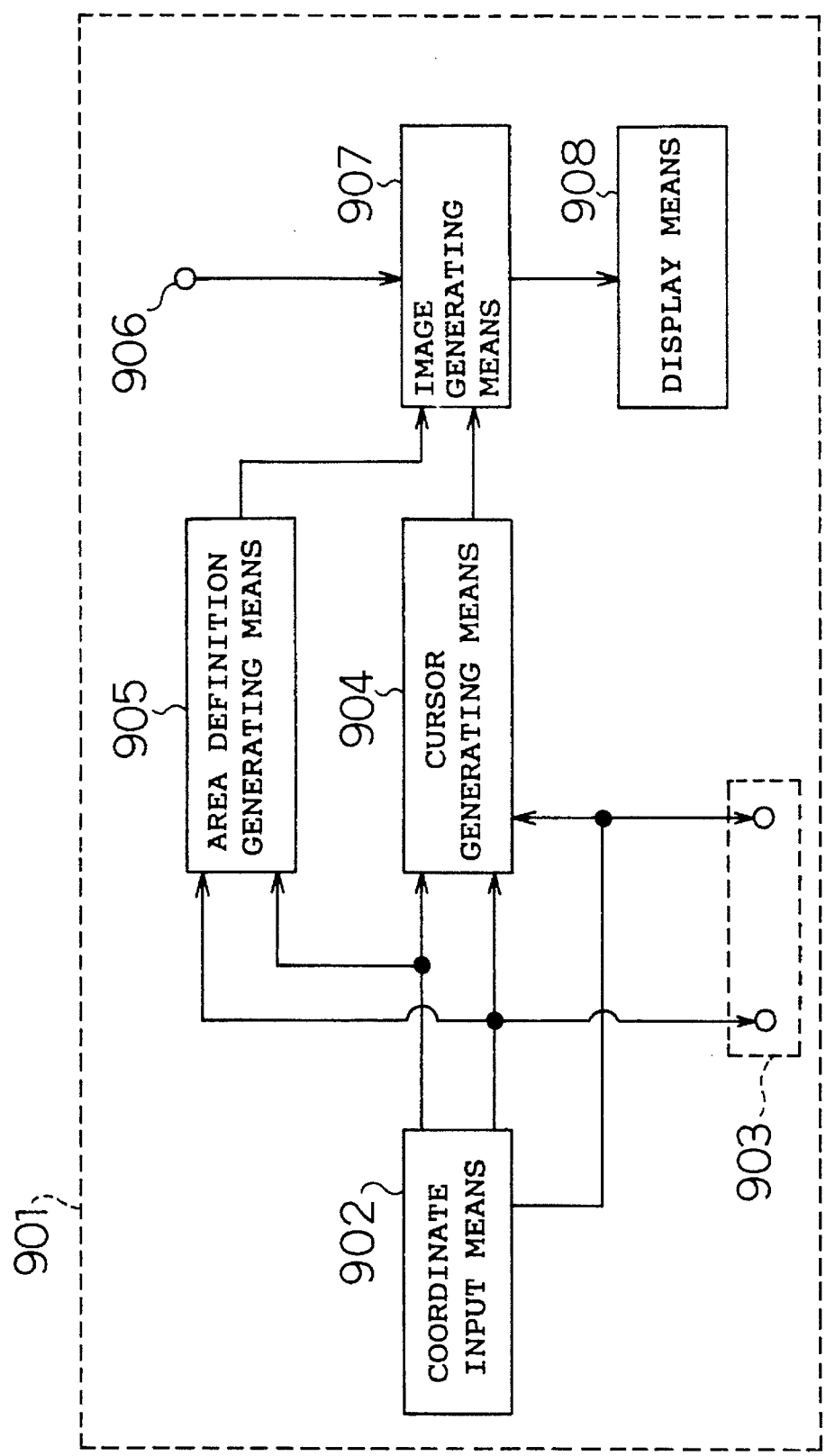
FIG. 9 is a block diagram showing the configuration of a third embodiment of the invention.

FIG. 9 is a block diagram showing a simplified form of the configuration of the third embodiment. Reference numeral 901 indicates an input device, which comprises a coordinate input means 902, a coordinate output terminal 903, a cursor generating means 904, an image input terminal 906, an image generating means 907, and a display means 908.

The coordinate input means, indicated at 902, monitors the position of an object placed in close proximity thereto. The coordinate input means 902 outputs the coordinates of the object under detection, detection information indicating whether the coordinates of the object under detection are detected, and pressing information indicating whether the coordinate input means 902 is being pressed by the object under detection.

The coordinate output terminal, indicated at 903, is coupled to the coordinates and pressing information output from the coordinate input means 902. The coordinate output terminal 903 is used to supply the position information of the detected object obtained by the input device 901 to an external device.

The cursor generating means, indicated at 904, accepts at its inputs the detection information, coordinates, and pressing information output from the coordinate input means 902, and generates an image which is output.

Reference numeral 905 indicates an area definition generating means. The area definition generating means 905 accepts at its input the detection information output from the coordinate input means 902. When the coordinates are detected, the area definition generating means 905 generates an image of a frame defining a movable range of a cursor, and outputs the generated image. The center of the area defining means generated here is repositioned to align with the position of the cursor output from the coordinate definition generating means each time the presentation of the area defining means is started. This will be described in further detail below.

The position of the area defining means on the screen is moved in reference to the immediately preceding cursor position each time the area defining means is displayed. At this time, the position of the area defining means is adjusted so that the cursor displayed within the frame of the area defining means moves to the position corresponding to the absolute coordinates output from the coordinate input means. For example, when the absolute coordinates output from the coordinate input means represent a movement to the left, the area defining means is moved to the right to be containing the cursor in the left with respect to the area definition means.

Figure 10A:
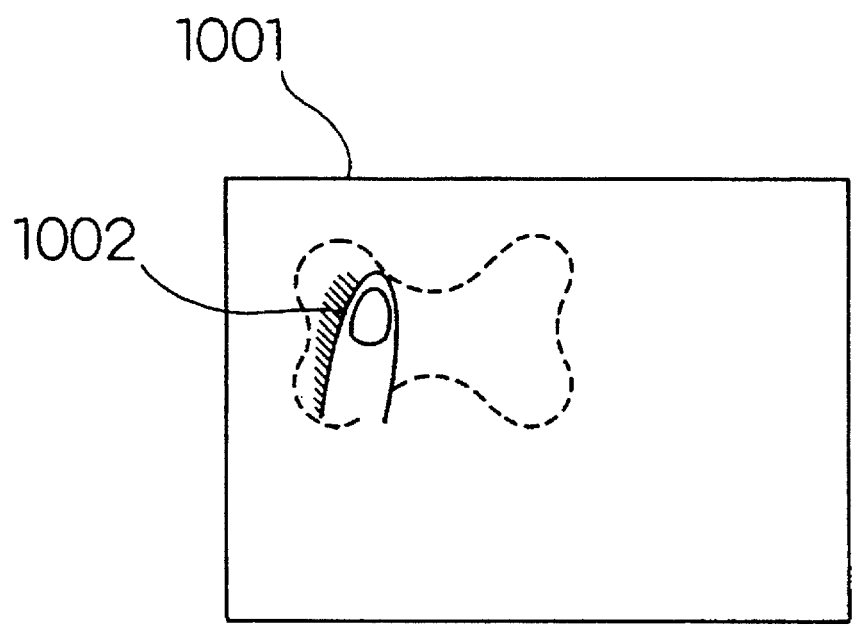
FIGS. 10(a) and 10(b) show examples of images according to the third embodiment of the invention.
Figure 10B:
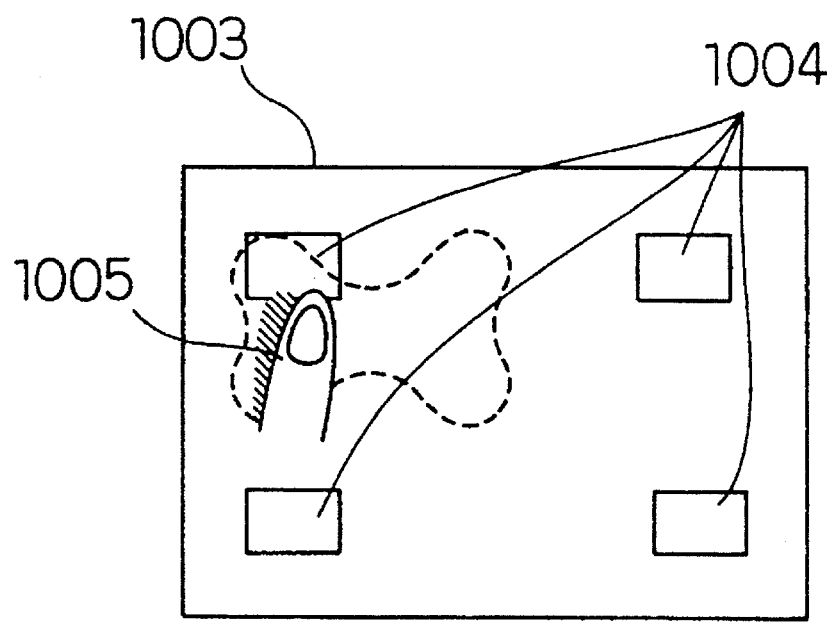

Output examples of the cursor generating means 904 will be described with reference to FIG. 10.

Reference numeral 1001 shows an example of an image that the cursor generating means 904 outputs when the coordinates are detected but no pressing is present. In the image 1001, the cursor is repositioned after detection of the coordinates.

Reference numeral 1002 is the cursor. A cursor similar to the one used in the first embodiment may be used as the cursor 1002 in this example.

The operation of the area definition generating means 905 will be described below with reference to FIG. 10. Reference numeral 1003 indicates the image that the area definition generating means outputs. Reference numeral 1004 indicates an area defining means which defines the movable range of the cursor. The area defining means has a shape that matches the shape of the operating area limiting means. This enables the user to recognize easily that by moving the finger within the operating area limiting means, the cursor can be moved precisely within the whole area defined by the area defining means.

The image input terminal, indicated at 906, is used to connect the input device 901 to an image output of an external device.

The image generating means, indicated at 907, accepts at its inputs the output of the cursor generating means 904, the output of the area defining means, and the output of the image input terminal 906. The image generating means 907 outputs an image synthesized by superimposing an image output from the cursor generating means 904 over an image synthesized by superimposing the image output from the area definition generating means over an image input from the image input terminal 906. An example of the image generated by the image generating means 907 will be described with reference to drawing. Reference numeral 1005 indicates the image that the image generating means 907 outputs when the output of the cursor generating means is the image 1001, the output of the area defining means is the image 1003, and the output of the image input terminal 906 is the image 2001. Indicated at 1007 is the cursor which is the same as the cursor 1002 included in the image 1001 output from the cursor generating means 904. Reference numeral 1006 indicates an image included in the image 2001 input at the image input terminal 906.

The display means, indicated at 908, accepts at its input the image output from the image generating means 907. The display means 908 displays the input image. The display means 908 is, for example, a CRT display.

Figure 11:
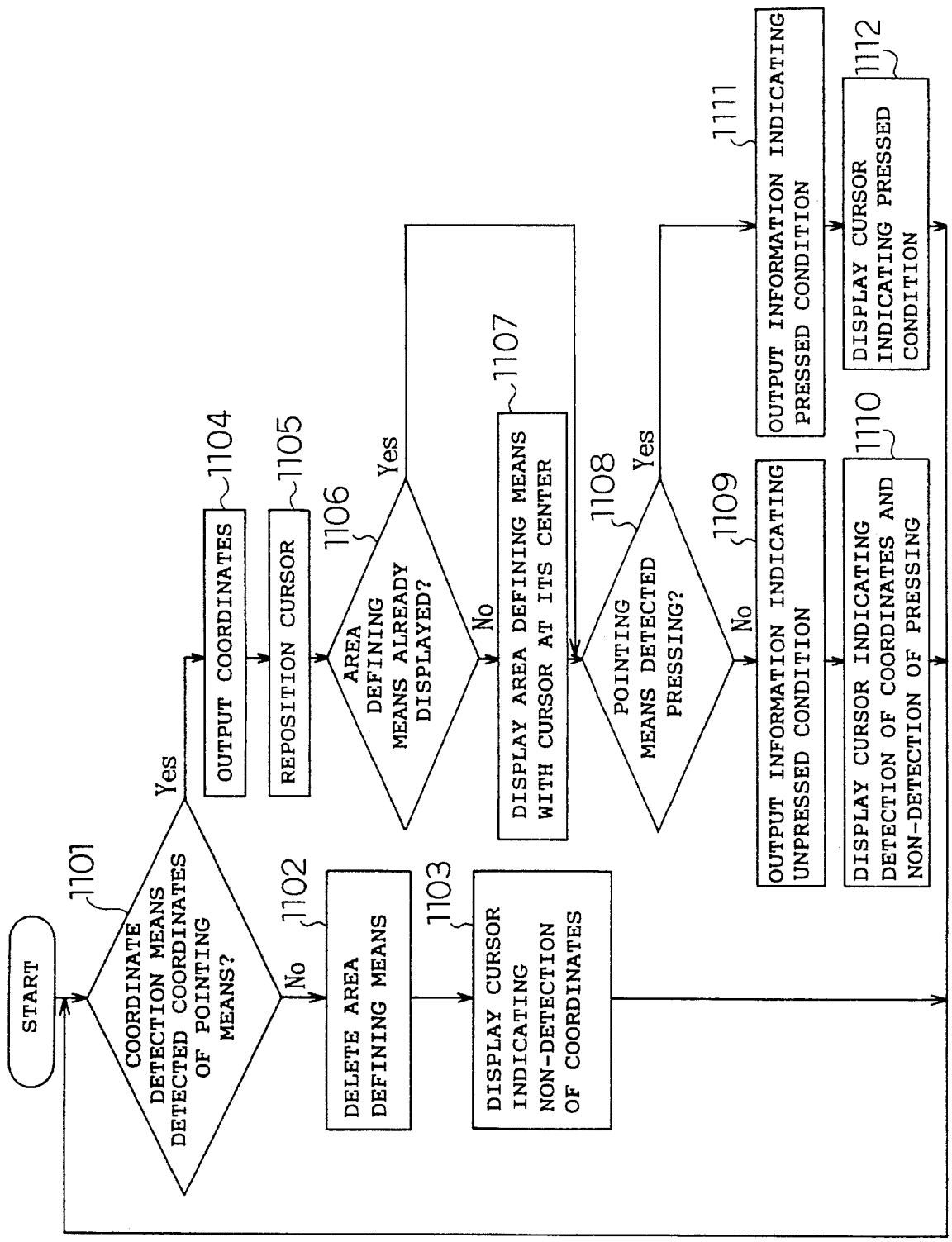
FIG. 11 is a flowchart for explaining the operation of the third embodiment of the invention.

Next, the operation of the third embodiment of the present invention will be described with reference to the flowchart shown in FIG. 11.

(Step 1101) When the coordinate input means 902 has detected the coordinates of the pointing means, the process proceeds to step 1104.

(Step 1102) The area definition generating means generates an image with the area defining means deleted. The generated image is fed to the image generating means 907 for image synthesis, and the synthesized image is displayed on the display means 908.

(Step 1103) The cursor generating means 904 generates an image with the cursor changed to a pictorial symbol that indicates non-detection of the coordinates. The generated image is fed to the image generating means 907 for image synthesis, and the synthesized image is displayed on the display means 908. The process returns to step 1101.

(Step 1104) The coordinates obtained in step 1101 are output at the output terminal.

(Step 1105) The cursor generating means 904 changes the position of the cursor in accordance with the coordinates output from the coordinate input means 902. The generated image is then fed to the image generating means 907 for image synthesis, and the synthesized image is displayed on the display means 908. The image with the cursor repositioned accordingly is thus displayed on the screen. It should be noted here that the amount of cursor movement is determined by the pointer's coordinates obtained by the coordinate input means 902. For example, the absolute coordinates of the cursor take values that are linear with respect to the absolute coordinates obtained by the coordinate input means 902, or the absolute coordinates of the cursor are incremented or decremented by a value corresponding to the increase or decrease of the coordinates under detection by the coordinate input means 902.

(Step 1106) If the area defining means is already displayed, the process proceeds to step 1108.

(Step 1107) The area definition generating means generates an image containing therein the area defining means. The center of the area definition in the image generated at this time coincides with the position of the cursor. The generated image is fed to the image synthesizing means 907 for image synthesis, and the synthesized image is displayed on the display means 908.

(Step 1108) When the coordinate input means 902 is in a pressed condition, the process proceeds to step 1111.

(Step 1109) Information indicating an unpressed condition is output at the output terminal.

(Step 1110) The cursor generating means 904 generates an image with the cursor changed to a one used when the coordinates are detected but no pressing is present. The generated image is fed to the image generating means 907 for image synthesis, and the synthesized image is displayed on the display means 908. The image with the cursor changed to the one indicating an unpressed condition is thus displayed on the screen. The process returns to step 1101.

(Step 1111) Information indicating a pressed condition is output at the output terminal.

(Step 1112) The cursor generating means 904 generates an image with the cursor changed to a one indicating a pressed condition. The generated image is fed to the image synthesizing means 907 for image synthesis, and the synthesized image is displayed on the display means 908. The image with the cursor changed to the one indicating a pressed condition is thus displayed on the screen. The process returns to step 1101.

Next, the configuration of a fourth embodiment corresponding to the invention of claim 10 will be described.

Figure 12:
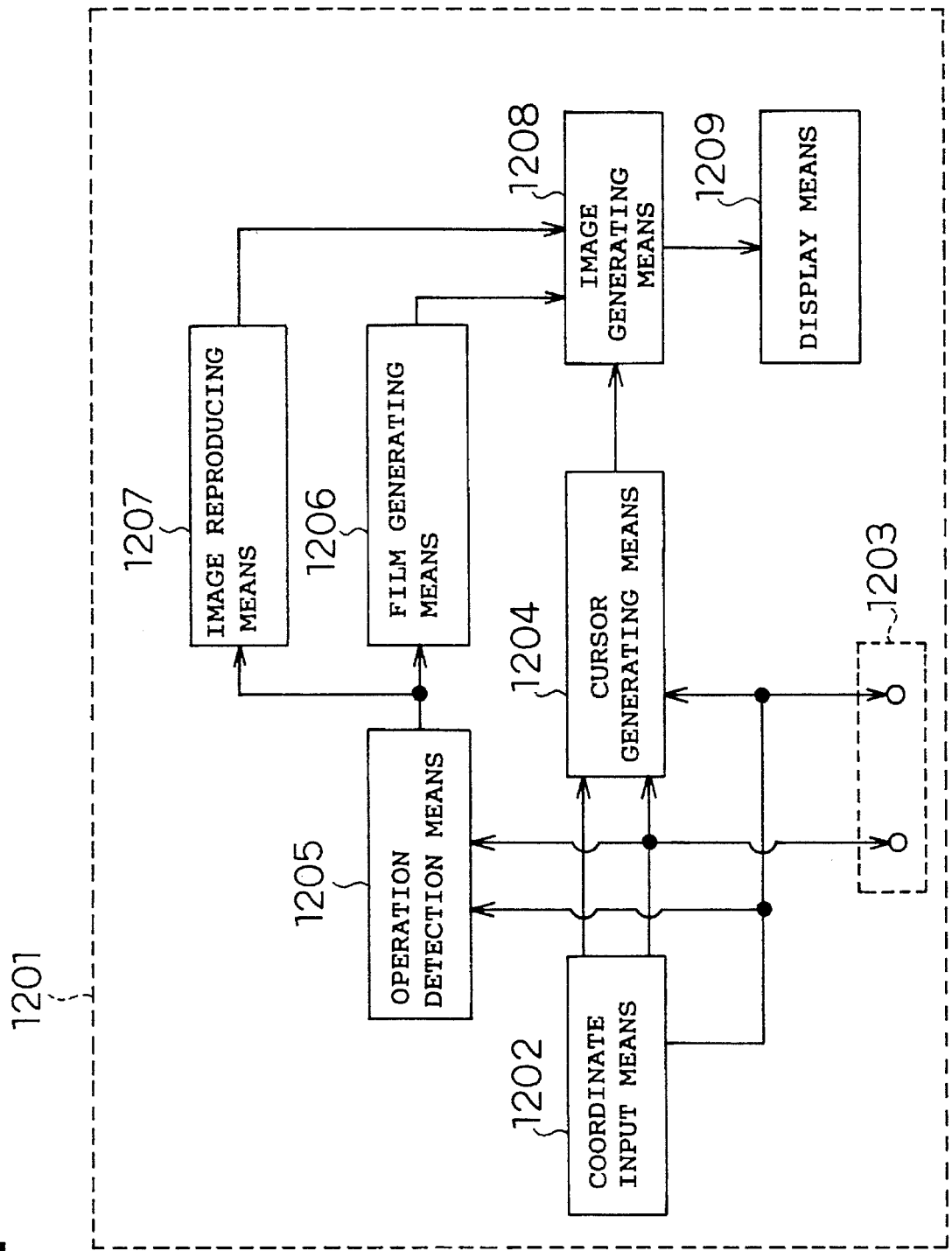
FIG. 12 is a block diagram showing the configuration of a fourth embodiment of the invention.

FIG. 12 is a block diagram showing a simplified form of the configuration of the fourth embodiment.

Reference numeral 1201 indicates an input device, which comprises a coordinate input means 1202, a coordinate output terminal 1203, a cursor generating means 1204, an operation detection means 1205, a film generating means 1206, an image reproducing means 1207, an image generating means 1208, and a display means 1209.

The coordinate input means, indicated at 1202, monitors the position of an object placed in close proximity thereto. The coordinate input means 1202 outputs the coordinates of the object under detection, detection information indicating whether the coordinates of the object under detection are detected, and pressing information indicating whether the coordinate input means 1202 is being pressed by the object under detection. A similar component to the coordinate input means 102 used in the first embodiment can be used as the coordinate input means 1202.

The coordinate output terminal, indicated at 1203, is coupled to the coordinates and pressing information output from the coordinate input means 1202. The coordinate output terminal 1203 is used to supply the position information of the detected object obtained by the input device 1201 to an external device. A similar component to the coordinate output terminal 103 used in the first embodiment can be used as the coordinate output terminal 1203.

The cursor generating means, indicated at 1204, accepts at its inputs the detection information, coordinates, and pressing information output from the coordinate input means 1202, and generates an image which is output. A similar component to the cursor generating means 104 used in the first embodiment can be used as the cursor generating means 1204.

The operation detection means, indicated at 1205, accepts at its inputs the coordinates and pressing information output from the coordinate input means 1202, and outputs operation information. The operation information here includes either (1) an instruction, containing the value of displacement as an argument (parameter), instructing to move by a distance corresponding to the displacement indicated by the argument or (2) an instruction, containing the value of speed as an argument, instructing to maintain the speed indicated by the argument.

Figure 13:
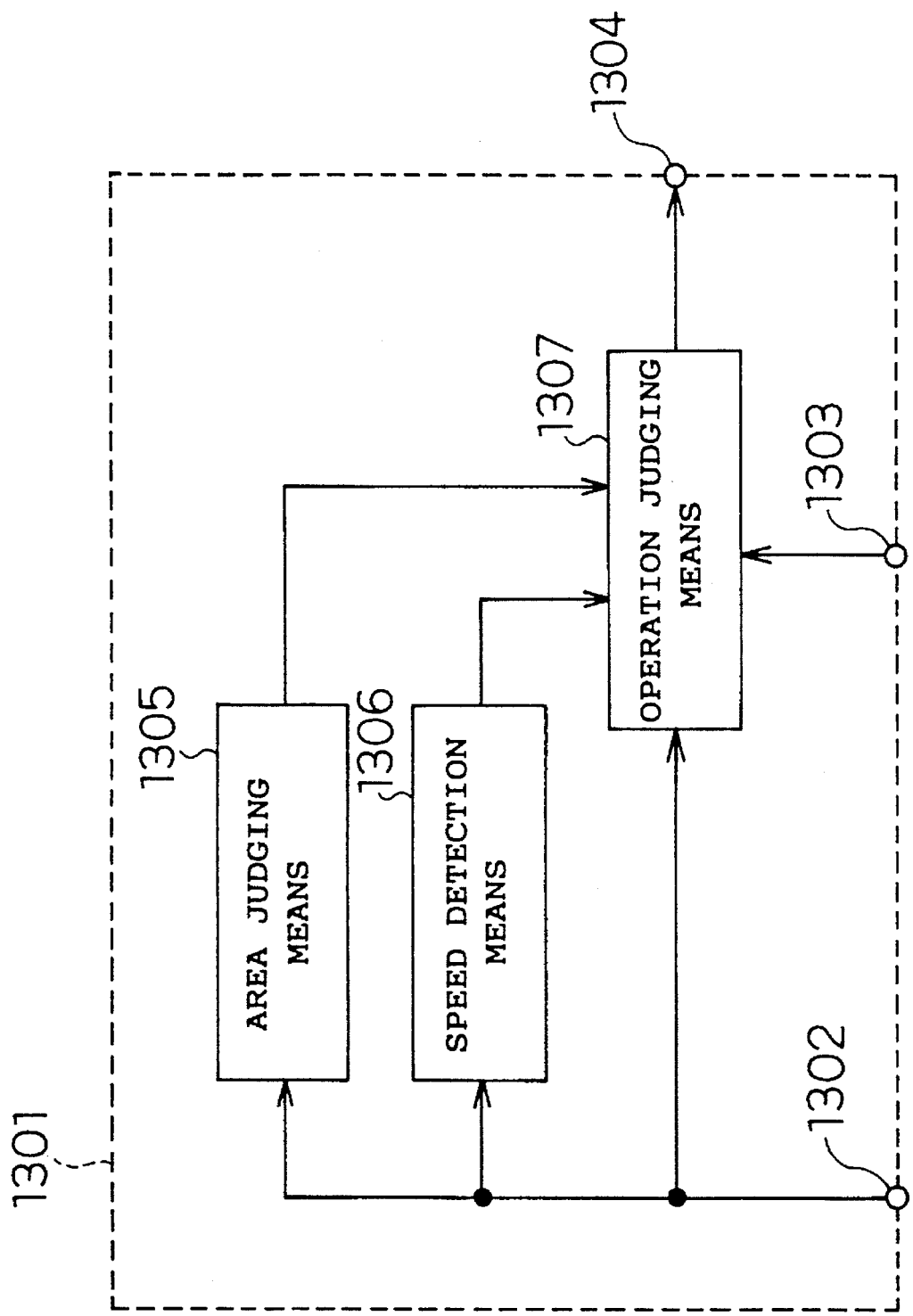
FIG. 13 is a block diagram showing the configuration of an operation detection means according to the fourth embodiment of the invention.

The operation detection means 1205 will be described in detail below with reference to FIG. 13.

Reference numeral 1301 indicates the operation detection means, which comprises a coordinate input terminal 1302, a pressing information input terminal 1303, an operation information output terminal 1304, an area judging means 1305, a speed detection means 1306, and an operation judging means 1307. The operation detection means 1301 accepts the coordinates at the coordinate input terminal 1302 and the pressing information at the pressing information input terminal 1303, and outputs the operation information at the operation information output terminal 1304.

The coordinate input terminal 1302 is used to input coordinate information.

The pressing information input terminal 1303 is used to input pressing information.

The operation information output terminal 1304 outputs the operation information.

The area judging means, indicated at 1305, accepts at its input the coordinate information output from the coordinate input terminal 1302, and outputs area judging information indicating whether the input coordinates are within the area preset in the area judging means 1305.

The speed detection means, indicated at 1306, outputs speed information. The speed information output from the speed detection means 1306 represents the rate of displacement per unit time of the coordinate information input from the coordinate input terminal.

The operation judging means, indicated at 1307, accepts at its inputs the area judging information output from the area judging means 1305 and the speed information output from the speed detection means 1306, and outputs the operation information.

Figure 14:
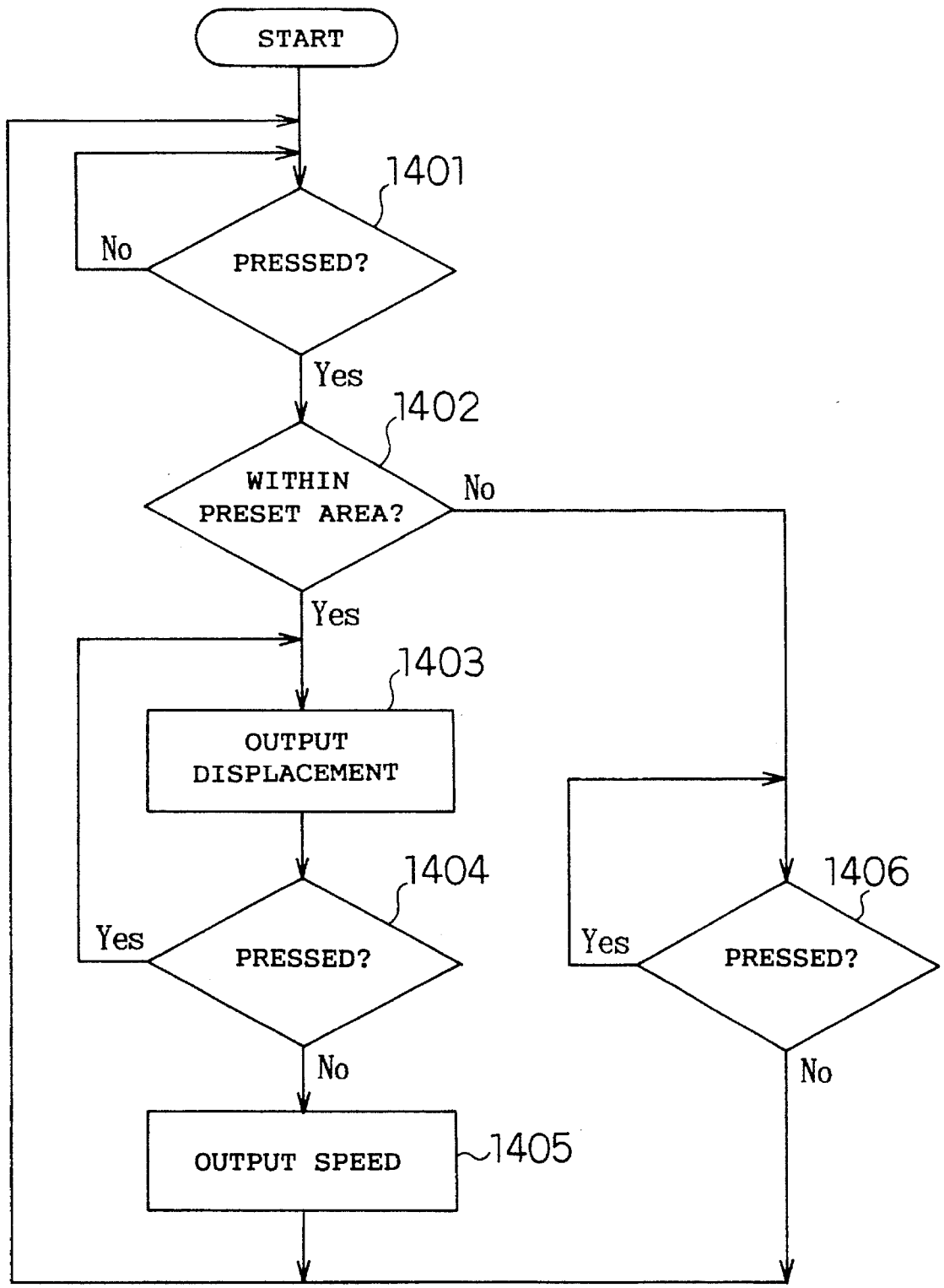
FIG. 14 is a flowchart for explaining the operation of the operation detection means according to the fourth embodiment of the invention.

The operation of the operation detection means 1301 will be described with reference to the flowchart shown in FIG. 14.

(Step 1401) If the input pressing information does not indicate a pressed condition, step 1401 is repeated.

(Step 1402) If the input coordinates are outside the area preset in the area judging means 1305, the process proceeds to step 1406.

(Step 1403) An instruction to move by a distance corresponding to the displacement indicated by an argument is output at the operation information output terminal 1304. The value of the argument here represents the displacement of the current coordinates with respect to the coordinate information input at the coordinate input terminal 1302 that was referenced when outputting the immediately preceding displacement at the operation information output terminal 1304.

(Step 1404) If the input pressing information indicates a pressed condition, the process returns to step 1403.

(Step 1405) An instruction, containing the value of speed output from the speed detection means 1306 as an argument, instructing to maintain the speed indicated by the argument is output at the operation information output terminal 1304. The process then returns to step 1401.

(Step 1406) If the input pressing information indicates a pressed condition, step 1406 is repeated. Otherwise, the process returns to step 1401.

The film generating means, indicated at 1206, accepts at its input the operation information output from the operation detection means 1205, and outputs image information containing a pictorial pattern denoting a film. Here, the area that the film occupies in the image information is the area preset in the area judging means 1305.

Figure 15A:
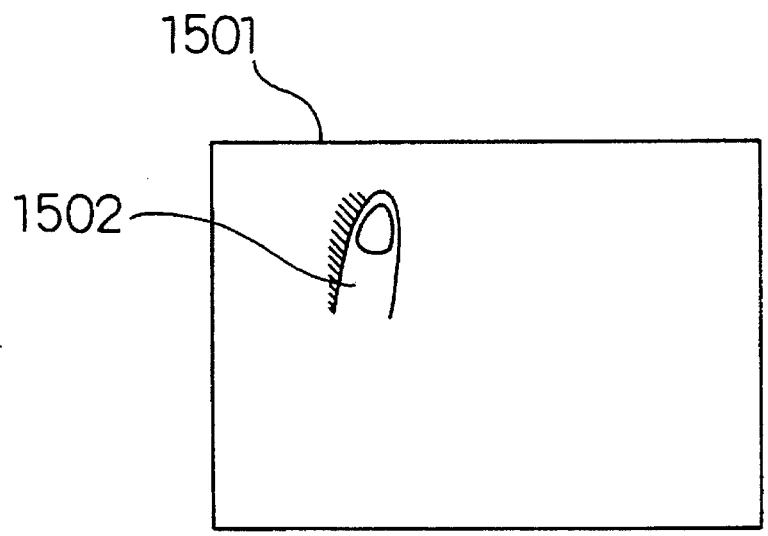
FIGS. 15(a)–15(c) show examples of images according to the fourth embodiment of the invention.
Figure 15B:
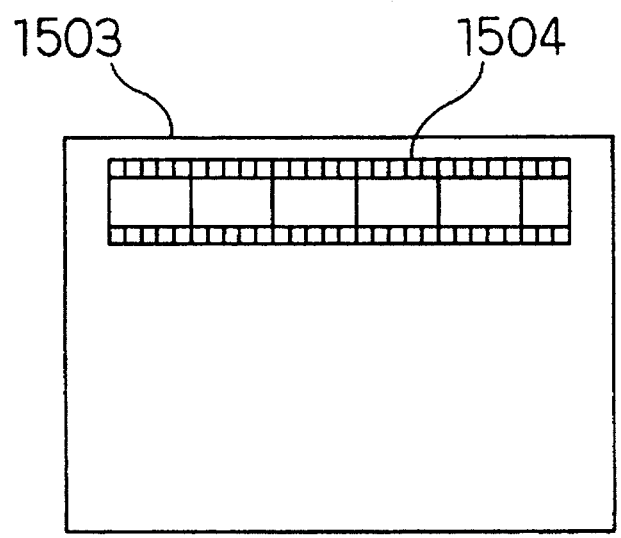
Figure 15C:
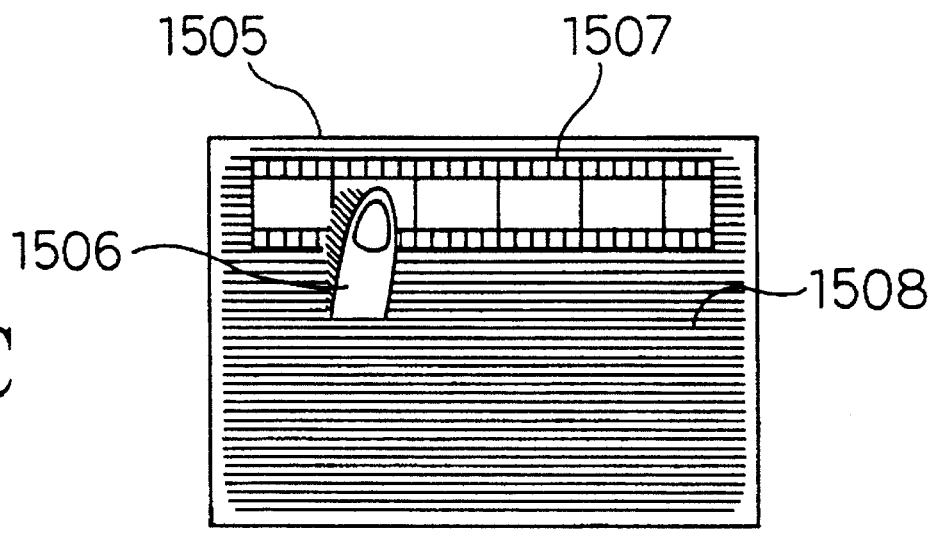
Figure 18:
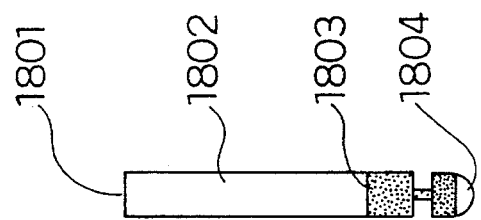
FIG. 18 is a diagram showing an example of the structure of a pointing means of the prior art device.
Figure 17:
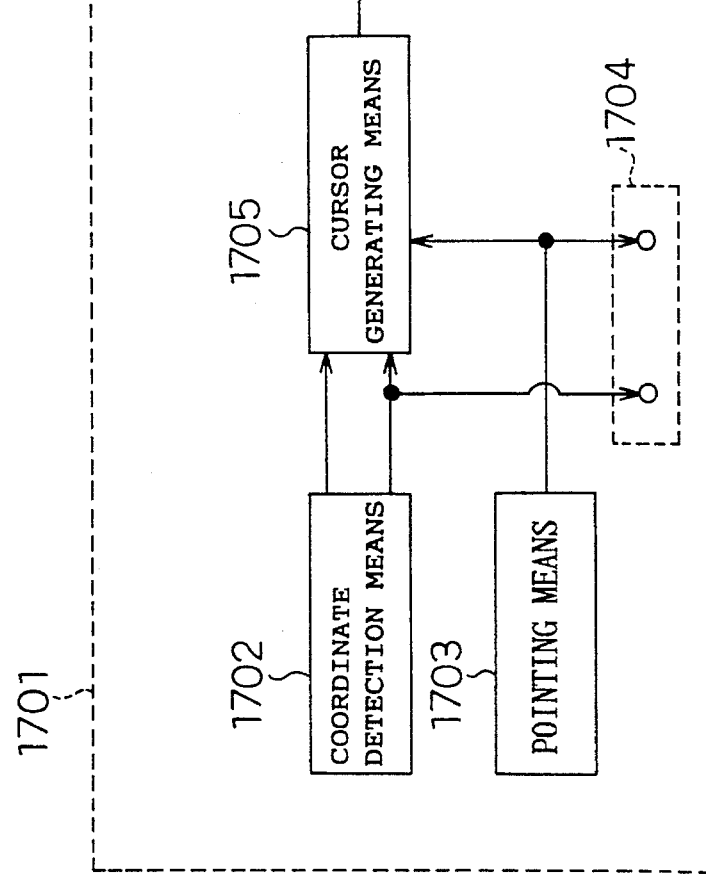
FIG. 17 is a block diagram showing the configuration of a prior art device.
Figure 19:
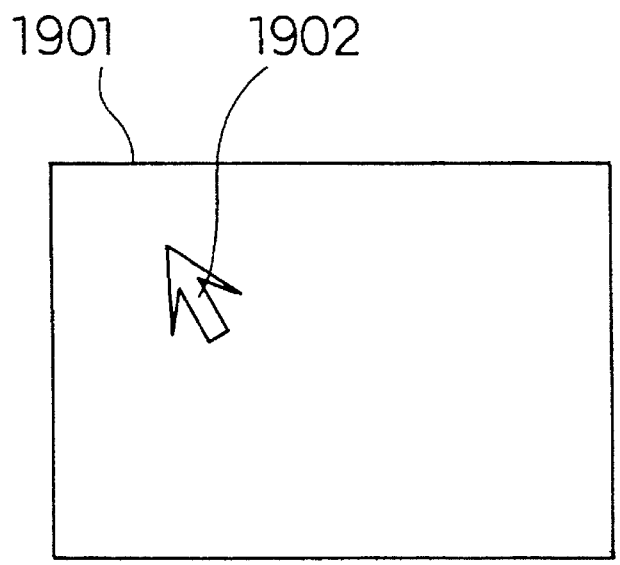
FIG. 19 is a diagram showing an example of an image generated by a cursor generating means of the prior art device.

Examples of images that the film generating means 1206 generates will be described below with reference to FIG. 15.

Reference numeral 1503 shows an image generated by the film generating means 1206.

Reference numeral 1504 designates a pictorial pattern denoting a film. The area that the film pattern 1504 occupies in the image 1503 is the area preset in the area judging means 1305.

When the operation information is the instruction (1) instructing to move by a distance corresponding to the displacement indicated by the argument, the film pattern is changed to a pattern moved by the distance corresponding to the displacement indicated by the argument. In this case, the film pattern remains in a stopped condition after the change, regardless of whether the immediately preceding speed is maintained or not.

On the other hand, when the operation information is the instruction (2) instructing to maintain the speed indicated by the argument, the film pattern is changed to a pattern that appears as if the film is constantly moving at the speed indicated by the argument.

In this manner, the film screen image contained in the output of the film generating means 1206 changes to an image of a pattern that appears as if the film is moving, in accordance with the input operation information.

The image reproducing means, indicated at 1207, accepts at its input the operation information output from the operation detection means 1205, and generates an image for output. The image reproducing means 1207 stores moving images, and has the ability to reproduce the moving images at normal speed and at various other speeds including frame-by-frame reproduction, and also the ability to change the position where the image is reproduced for a specified time. The image reproducing means 1207 is, for example, a video disk apparatus or a video tape recorder with a control terminal.

When the operation information is the instruction (1) instructing to move by a distance corresponding to the displacement indicated by the argument, the position at which to reproduce the image is moved by a distance proportional to the displacement indicated by the argument. However, the reproduced image remains temporarily stopped regardless of whether the reproduction is being continued at the immediately preceding speed.

On the other hand, when the operation information is the instruction (2) instructing to maintain the speed indicated by the argument, the reproduction of the image is started at a constant speed. The reproduction speed is related to the speed indicated by the argument by a predetermined rule. For example, the reproduction speed increases as the speed indicated by the argument is increased. Further, it is adjusted so that when the user moves the coordinates on the coordinate input means at a natural stroking speed, the image is reproduced at normal speed.

In this manner, the image reproducing means 1207 continuously reproduces images at a constant speed or changes the position of reproduction for the time corresponding to the displacement, in accordance with the input operation information.

The image generating means, indicated at 1208, accepts at its inputs an image output from the cursor generating means 1204, an image output from the film generating means 1206, and an image 1508 output from the image reproducing means 1207, and outputs a synthesized image. The image generating means 1208 synthesizes an image by superimposing the image output from the cursor generating means 1204 over an image synthesized by superimposing the image output from the film generating means 1206 over the image output from the image reproducing means 1207.

An example of the image generated by the image synthesizing means 1208 will be described below with reference to FIG. 15.

Reference numeral 1501 shows an example of the image output from the cursor generating means 1204.

Reference numeral 1502 indicates the cursor included in the image 1501.

Reference numeral 1503 is an example of the image output from the film generating means 1206.

Reference numeral 1505 shows the image that the image synthesizing means 1208 outputs when the output of the cursor generating means is the image 1501 and the output of the film generating means is the image 1503.

The cursor indicated at 1506 is the same as the cursor 1502 included in the image 1501 output from the cursor generating means 1204.

The pattern indicated at 1507 is the same as the film pattern 1504 included in the image 1503 input from the film generating means 1206. A portion of the pattern here may be covered by the cursor 1502.

The image indicated at 1508 is the same as the image output from the image reproducing means 1207. A portion of the image may be covered by the cursor 1502 or the film pattern 1504.

The display means, indicated at 1209, accepts the image output from the image generating means 1208, and displays the input image. Means of the same structure as the coordinate input means 107 used in the first embodiment can be used as the coordinate input means 1202.

The operation of the fourth embodiment of the present invention will be described below with reference to the flowchart shown in FIG. 16.

(Step 1601) When the coordinate input means 1202 has detected the coordinates of the pointing means, the process proceeds to step 1603.

(Step 1602) The cursor generating means 1204 generates an image with the cursor 1502 changed to a pictorial symbol indicating non-detection of the coordinates. The generated image is fed to the image generating means 1208 for image synthesis, and the synthesized image is displayed on the display means 1209. Then, the process returns to step 1601.

(Step 1603) The coordinates obtained in step 1601 are output at the coordinate output terminal 1302.

(Step 1604) The cursor generating means 1204 changes the position of the cursor 1502 in accordance with the coordinates output from the coordinate input means 1202.

The generated image is fed to the image generating means 1208 for image synthesis, and the synthesized image is displayed on the display means 1209. The image with the cursor 1502 repositioned accordingly is thus displayed on the screen. It should be noted here that the absolute coordinates of the cursor 1502 take values that are linear with the absolute coordinates obtained by the coordinate input means 1202.

(Step 1605) When the coordinate input means 1202 is in a pressed condition, the process proceeds to step 1612.

(Step 1606) Information indicating an unpressed condition is output at the coordinate output terminal 1302.

(Step 1607) The cursor generating means 1204 generates an image with the cursor changed to a one used when the coordinates are detected but no pressing is present. The generated image is fed to the image generating means 1208 for image synthesis, and the synthesized image is displayed on the display means 1209. The image with the cursor changed to the one indicating an unpressed condition is thus displayed on the screen. Then, the process returns to step 1601.

(Step 1608) When the immediately preceding pressing information output from the coordinate input means 1202 indicates a pressed condition, and when the coordinates output from the coordinate input means 1206 at the completion of the transition to the pressed condition fall within the area preset in the area judging means 1305, the process returns to 1601. That is, if the pressing information has changed from a pressed condition to an unpressed condition, the process then proceeds to the next step 1609; otherwise, the process returns to step 1601.

(Step 1609) Since the pressing information has changed from a pressed condition to an unpressed condition, and since the coordinates output from the coordinate input means 1206 at the completion of the previous transition to the pressed condition were within the area preset in the area judging means 1305, the operation detection means 1205 outputs operation information containing the value of speed as an argument corresponding to the change in the coordinates output from the coordinate input means 1202, and instructing to maintain the speed indicated by the argument.

(Step 1610) Since the information instructing to maintain the speed is input to the film generating means 1206, the pattern is changed to a pattern that appears as if it is moving at the speed given in step 1609, and the presentation of the thus changed pattern continues.

(Step 1611) Since the information instructing to maintain the speed is input to the image reproducing means 1207, reproduction at the speed given in step 1609 is started, and the reproduction continues at that speed. Then, the process returns to step 1601.

(Step 1612) Information indicating a pressed condition is output at the coordinate output terminal 1203.

(Step 1613) The cursor generating means 1204 generates an image with the cursor 1502 changed to a one indicating a pressed condition. The generated image is fed to the image synthesizing means 1208 for image synthesis, and the synthesized image is displayed on the display means 1209. The image with the cursor 1502 changed to the one indicating a pressed condition is thus displayed on the screen. The process returns to step 1601.

(Step 1614) When transition is made to the pressed condition, if the coordinates output from the coordinate input means 1206 fall outside the area preset in the area judging means 1305, the process returns to step 1601.

(Step 1615) Since the pressing information indicates the pressed condition, and since the coordinates output from the coordinate input means 1206 at the completion of the transition to the pressed condition were within the area preset in the area judging means 1305, the operation detection means 1205 outputs operation information containing the value of displacement as an argument, directing a movement by a distance corresponding to the displacement indicated by the argument.

(Step 1616) Since the information directing a movement by a distance corresponding to the displacement is input to the film generating means 1206, the pattern of the film 1502 is changed to a pattern moved exactly by the displacement indicated by the argument. At this time, the movement of the film remains stopped regardless of whether the immediately preceding speed is maintained or not.

(Step 1617) Since the information directing a movement by a distance corresponding to the displacement is input to the image reproducing means 1207, the position of reproduction is moved by a distance proportional to the displacement indicated by the argument. At this time, a still image continues to be displayed regardless to whether or not the reproduction is maintained at the immediately preceding speed. Then, the process returns to step 1601.

As described, according to the present invention, since means for detecting pressing information and means for detecting coordinates are constructed integrally, coordinates can be input directly by using a human body part such as a finger, obviating the need for a cumbersome action, such as holding a special pen with a hand, before starting the input operation. Furthermore, since the cursor has a shape that resembles the pointing object, it is easy to recognize that when the pointing object is moved, the cursor also moves. Additionally, since the area defining means has a shape that matches the shape of the operating area limiting means, the user can easily recognize that by moving the finger within the operating area limiting means, the cursor can be moved precisely within the whole area defined by the area defining means.

Particularly, with the cursor moved onto the film and pressed on it, when the finger or the like is moved in the same direction as the moving direction of the film, the position of the reproduced image can be changed as desired. That is, the position of the reproduced still image can be changed by moving the finger as if to draw the film to the right or left. Further, when the finger is pressed on the film and moved sideways, and then the pressing force is released during the movement, the film continues to move at the speed effective when the pressing force was released, or image reproduction starts at the speed that matches the film speed. In other words, image reproduction speed can be controlled using a finger as if to flick the film with a finger.

This achieves an input device that is natural to operate and that reduces user fatigue.

What is claimed is:

1. An input device comprising:
   coordinate input means for outputting one- or higher-dimensional absolute coordinates of an object placed in close proximity thereto or in contact therewith, pressed or not-pressed information indicating whether said object is pressed or not pressed thereon, and coordinate detected or not-detected information indicating whether the coordinates of said object are detected or not, cursor generating means for accepting at inputs thereof said coordinates, said pressed or not-pressed information, and said coordinate detected or not-detected information output from said coordinate input means, and for outputting an image containing therein a cursor representing said coordinates, area definition generating means for accepting at an input thereof said coordinate detected or not-detected information output from said coordinate input means, and for outputting an image containing therein an area definition defining a movable area of said cursor when said coordinate detected or not-detected information indicates the detection of said coordinates, and image generating means for accepting at inputs thereof the image output from said area definition generating means and the image output from said cursor generating means, and for producing an image by superimposing said input images one over the other for output, wherein said cursor generating means repositions said cursor in accordance with said input absolute coordinates and also changes the external appearance of said cursor on the basis of said pressed or not-pressed information and said coordinate detected or not-detected information.

2. An input device comprising:

coordinate input means for outputting an information of one- or higher-dimensional relative coordinates of a close or contacting object, the relative coordinates being determined with respect to the absolute coordinates which is obtained from a position of the object when the position is detected by the coordinate input means, and also outputting pressed or not-pressed information indicating whether said object is pressed or not pressed thereon, cursor generating means for accepting at inputs thereof said relative coordinates and said pressed or not-pressed information output from said coordinate input means, and for outputting an image containing therein a cursor representing said coordinates, area definition generating means for generating and outputting an image containing therein an area definition defining a movable area of said cursor which, when the absolute coordinates of said object are obtained by said coordinate input means, is displayed within a prescribed display screen in accordance with a predetermined rule using said absolute coordinates, and image generating means for outputting a synthesized image synthesized by superimposing the image output from said cursor generating means over the image output from said area definition generating means, wherein said cursor generating means repositions said cursor in accordance with said relative coordinates and also changes the external appearance of said cursor on the basis of said pressed or not-pressed information, and outputs an image of said cursor that moves within said movable area in accordance with said relative coordinates, starting from the initial position thereof defined by a predetermined rule within said movable area in said image to be synthesized.

3. An input device comprising:

coordinate input means for outputting one- or higher-dimensional coordinates of an object placed in close proximity thereto or in contact therewith and pressed or not-pressed information indicating whether said object is pressed or not pressed thereon, cursor generating means for accepting at inputs thereof said coordinates and said pressed or not-pressed information output from said coordinate input means, and for outputting an image containing therein a cursor representing said coordinates, operation detection means for accepting at inputs thereof from said coordinate input means the one- or higher-dimensional coordinates of said proximate or contacting object and the pressed or not-pressed information indicating whether said coordinate input means is pressed by said object, and for outputting a displacement of said coordinates made during the pressing and a moving speed of said coordinates at the time when a transition is made from a pressed condition to an unpressed condition, film generating means for accepting at an input thereof the output of said operation detection means and for outputting a film pictorially representing a pattern of a movie film, and image reproducing means for accepting at an input thereof the output of said operation detection means and for reproducing and outputting a desired position of stored moving images, wherein said cursor generating means repositions said cursor in accordance with said input coordinates and also changes the external appearance of said cursor on the basis of said pressed or not-pressed information, and wherein when the output of said operation detection means represents the displacement, said film generating means changes the pattern of said film to a pattern indicating said film having moved by a distance corresponding to said displacement, and when the output of said operation detection means represents the moving speed, and film generating means continues changing the pattern so that said film continues to move at said moving speed, while when the output of said operation detection means represents the displacement, said image reproducing means moves said reproduced and output image position by a distance corresponding to said displacement, and when the output of said operation detection means represents the moving speed, said image reproducing means continues to reproduce said reproduced and output image at a speed corresponding to said moving speed.

\* \* \* \* \*